US012771767B2

(12) United States Patent
Lim

(10) Patent No.: US 12,771,767 B2
(45) Date of Patent: Oct. 20, 2026

(54) ELECTRONIC DEVICE INCLUDING DISPLAY AND METHOD FOR MANUFACTURING SAME

(71) Applicant: SAMSUNG ELECTRONICS CO., LTD., Suwon-si (KR)

(72) Inventor: Sunghwan Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 745 days.

(21) Appl. No.: 18/124,430

(22) Filed: Mar. 21, 2023

(65) Prior Publication Data

US 2023/0239384 A1 Jul. 27, 2023

Related U.S. Application Data

(63) Continuation of application No. PCT/KR2021/009104, filed on Jul. 15, 2021.

(30) Foreign Application Priority Data

Sep. 21, 2020 (KR) ........................ 10-2020-0121547

(51) Int. Cl.
*H04M 1/02* (2006.01)
*G06F 1/16* (2006.01)

(52) U.S. Cl.
CPC ........ *H04M 1/0268* (2013.01); *G06F 1/1616* (2013.01); *G06F 1/1624* (2013.01);
(Continued)

(58) Field of Classification Search
None
See application file for complete search history.

(56) References Cited

U.S. PATENT DOCUMENTS

2014/0029212 A1 1/2014 Hwang et al.
2014/0065401 A1* 3/2014 Donovan ................ C03C 3/093 428/220
2015/0049428 A1 2/2015 Lee et al.
2016/0187931 A1 6/2016 Myung et al.
2018/0364759 A1* 12/2018 Ahn ...................... B32B 27/281
2019/0033920 A1 1/2019 Yun et al.
(Continued)

FOREIGN PATENT DOCUMENTS

KR 10-2008-0071708 A 8/2008
KR 10-2014-0015881 A 2/2014
(Continued)

OTHER PUBLICATIONS

Communication dated Oct. 8, 2024, issued by Korean Intellectual Property Office in Korean Patent Application No. 10-2020-0121547.

(Continued)

*Primary Examiner* — Anthony J Frost
(74) *Attorney, Agent, or Firm* — Sughrue Mion, PLLC

(57) ABSTRACT

An electronic device and a method of manufacturing the electronic device are provided. The electronic device includes: a flexible display; and a cover window disposed on the flexible display, wherein the cover window includes a glass member and a buffer member disposed between the glass member and the flexible display, wherein the glass member includes at least one flat area and a bending area extending from the at least one flat area, and wherein a thickness of at least a portion of the bending area continuously decreases from a thickness of the at least one flat area as the bending area extends from the at least one flat area, and a width of the at least the portion of the bending area continuously decreases from a width of the at least one flat area as the bending area extends from the at least one flat area.

12 Claims, 22 Drawing Sheets

(52) U.S. Cl.
CPC .......... *G06F 1/1652* (2013.01); *G06F 1/1656* (2013.01); *G06F 1/1681* (2013.01); *H04M 1/0216* (2013.01); *H04M 1/0237* (2013.01)

(56) References Cited

U.S. PATENT DOCUMENTS

| | | | | |
|---|---|---|---|---|
| 2019/0045038 | A1* | 2/2019 | Zhou | B32B 27/36 |
| 2019/0104626 | A1 | 4/2019 | Jeon | |
| 2019/0268455 | A1* | 8/2019 | Baek | G06F 1/1652 |
| 2019/0281692 | A1* | 9/2019 | Jeon | H05K 1/147 |
| 2019/0310686 | A1 | 10/2019 | Lee et al. | |
| 2020/0292731 | A1 | 9/2020 | Park et al. | |

FOREIGN PATENT DOCUMENTS

| | | | |
|---|---|---|---|
| KR | 10-2015-0021167 | A | 3/2015 |
| KR | 10-2016-0083789 | A | 7/2016 |
| KR | 10-2017-0122554 | A | 11/2017 |
| KR | 10-2019-0012821 | A | 2/2019 |
| KR | 10-2019-0037585 | A | 4/2019 |
| KR | 10-2019-0061242 | A | 6/2019 |
| KR | 10-2019-0117985 | A | 10/2019 |
| KR | 10-2068685 | B1 | 1/2020 |
| KR | 10-2020-0049463 | A | 5/2020 |
| KR | 10-2020-0073596 | A | 6/2020 |

OTHER PUBLICATIONS

International Search Report (PCT/ISA/210) issued by the International Searching Authority on Oct. 14, 2021 in International Application No. PCT/KR2021/009104.

Written Opinion (PCT/ISA/237) issued by the International Searching Authority on Oct. 14, 2021 in International Application No. PCT/KR2021/009104.

* cited by examiner

ELECTRONIC DEVICE INCLUDING DISPLAY AND METHOD FOR MANUFACTURING SAME

CROSS-REFERENCE TO RELATED APPLICATIONS

This application is a by-pass continuation application of International Application No. PCT/KR2021/009104, filed on Jul. 15, 2021, which is based on and claims priority to Korean Patent Application No. 10-2020-0121547, filed on Sep. 21, 2020, in the Korean Intellectual Property Office, the disclosures of which are incorporated by reference herein in their entireties.

BACKGROUND

1. Field

The disclosure relates to an electronic device including a display and a manufacturing method thereof.

2. Description of Related Art

Due to the development of information and communication technology and semiconductor technology, various functions are being integrated into a single portable electronic device. For example, an electronic device may implement various functions, such as an entertainment function (e.g., a game function), a multimedia function (e.g., a music/video replay function), a communication and security function for mobile banking or the like, a schedule management function, and an e-wallet function, in addition to a communication function. Such an electronic device is being miniaturized so that a user is able to conveniently carry the electronic device.

As a mobile communication service is extended to the multimedia service area, it is necessary to increase the size of a display of an electronic device in order to allow users to fully utilize a multimedia service as well as a voice call or short message service. However, the size of the display of the electronic device has a trade-off relationship with the miniaturization of the electronic device.

An electronic device (e.g., a portable terminal) may include a display that is foldable into a flat surface or a flat surface and a curved surface. An electronic device including a display may have a limitation in implementing a screen larger than the size of the electronic device due to a fixed display structure. Accordingly, an electronic device including a foldable or rollable display is being researched.

A polyimide film or single-thickness thin glass may be used as a cover window of a foldable or rollable display to protect the display. However, since the cover window including a polyimide film has relatively low hardness, permanent deformation or wrinkles may occur. In addition, when thin glass is used as the cover window, durability against an external impact is low, and thus the electronic device and the display may be damaged.

In order to increase the durability of the cover window, glass having different thicknesses for respective areas may be used as the cover window. However, during a surface heat treatment process or a process of physically processing the glass to adjust the thickness of the glass, subsurface damage (SSD) may occur on the glass, reducing the durability of the cover window and forming a processing mark on the surface of the cover window.

SUMMARY

Provided are a display cover window capable of performing folding or rolling operations and having increased durability, and an electronic device including the display cover window.

Additional aspects will be set forth in part in the description which follows and, in part, will be apparent from the description, or may be learned by practice of the presented embodiments.

According to an aspect of the disclosure, an electronic device includes: a flexible display; and a cover window disposed on the flexible display, wherein the cover window includes a glass member and a buffer member disposed between the glass member and the flexible display, wherein the glass member includes at least one flat area and a bending area extending from the at least one flat area, and wherein a thickness of at least a portion of the bending area continuously decreases from a thickness of the at least one flat area as the bending area extends from the at least one flat area, and a width of the at least the portion of the bending area continuously decreases from a width of the at least one flat area as the bending area extends from the at least one flat area.

The glass member may further include a first surface facing the buffer member, and a flat second surface facing outward of the electronic device, and the buffer member may include a flat third surface facing the flexible display.

The bending area may include a first recess formed on a first surface facing the buffer member, and a second recess formed on an edge of the bending area, and the second recess extends continuously from the first recess.

A first length of the first recess in a thickness direction may be equal to a second length of the second recess in a width direction that is perpendicular to the thickness direction.

The electronic device may further include: a first housing configured to accommodate a portion of the flexible display and a portion of the cover window; a second housing configured to accommodate another portion of the flexible display and another portion of the cover window; and a hinge structure connecting the first housing to the second housing, and at least a portion of the bending area overlaps at least a portion of the hinge structure.

The bending area may include a first bending area and a second bending area that is spaced apart from the first bending area, the at least one flat area may include a first flat area, a second flat area that is spaced apart from the first flat area, and a third flat area that is spaced apart from the first flat area and the second flat area, and the third flat area may be between the first bending area and the second bending area.

The electronic device may further include: a first structure; a second structure surrounding at least a portion of the first structure and configured to guide a sliding movement of the first structure; and a roller rotatably mounted on a side edge of the second structure, at least a portion of the at least one flat area may be coupled to the first structure, and at least a portion of the bending area may be configured to be wound around the roller.

The cover window may further include: a scattering prevention film disposed on the glass member; and a coating layer disposed on the scattering prevention film.

At least a portion of the bending area may differ from another portion of the bending area by having been reacted with at least one of ammonium fluoride, sulfuric acid, nitric acid, silicofluoric acid, sodium hydroxide, and hydrofluoric acid.

The thickness of the bending area may be 30 μm to 50 μm, and the thickness of the at least one flat area may be 50 μm to 200 μm.

The buffer member may include at least one of an optically clear adhesive or a pressure-sensitive adhesive.

According to an aspect of the disclosure, a method of manufacturing an electronic device, includes: applying a protective ink to a front surface of a glass member including at least one flat area and a bending area extending from the at least one flat area, and to a rear surface of the at least one flat area of the glass member; folding the glass member such that at least portions of the front surface of the glass member face each other; immersing at least a portion of the bending area in a chemical solution configured to dissolve the glass member; and removing the protective ink.

The immersing the at least the portion of the bending area in the chemical solution may include moving the glass member in a first direction at which the chemical solution is located and moving the glass member in a second direction opposite to the first direction.

The chemical solution may include at least one of ammonium fluoride, sulfuric acid, nitric acid, silicofluoric acid, sodium hydroxide, or hydrofluoric acid.

The folding the glass member may include coupling the glass member to a jig which contacts the protective ink, the jig may include a plurality of protrusions facing the bending area, and a pin structure between the plurality of protrusions and facing the bending area, and the glass member may be between the plurality of protrusions and the pin structure.

The electronic device according to one or more embodiments of the disclosure may be capable of executing any of a folding operation and a rolling operation by using a glass member in which the thicknesses of the bending area and the flat region of the display are different from each other.

In the glass member according to one or more embodiments of the disclosure, the thickness and width of the bending area may have been continuously decreased by using a chemical solution. As a result, it may be possible to increase the durability of the glass member.

In the method of manufacturing an electronic device according to one or more embodiments of the disclosure, it may be possible to manufacture a glass member with increased durability by using a process of dipping a folded glass member into a chemical solution.

BRIEF DESCRIPTION OF DRAWINGS

The above and other aspects, features, and advantages of certain embodiments of the present disclosure will be more apparent from the following description taken in conjunction with the accompanying drawings in which.

DETAILED DESCRIPTION

Figure 1:
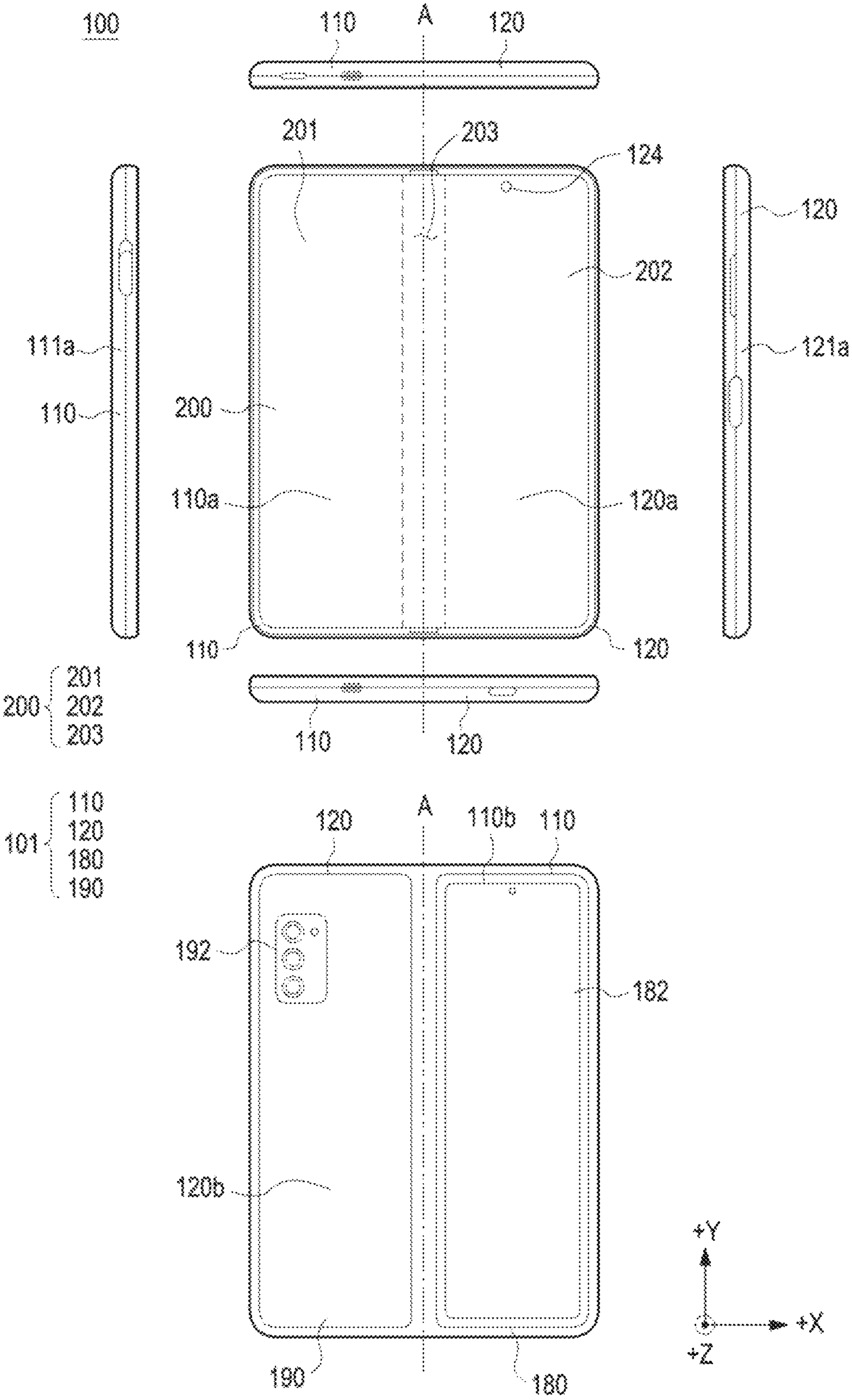
FIG. 1 is a view illustrating an unfolded state of an electronic device according to an embodiment of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
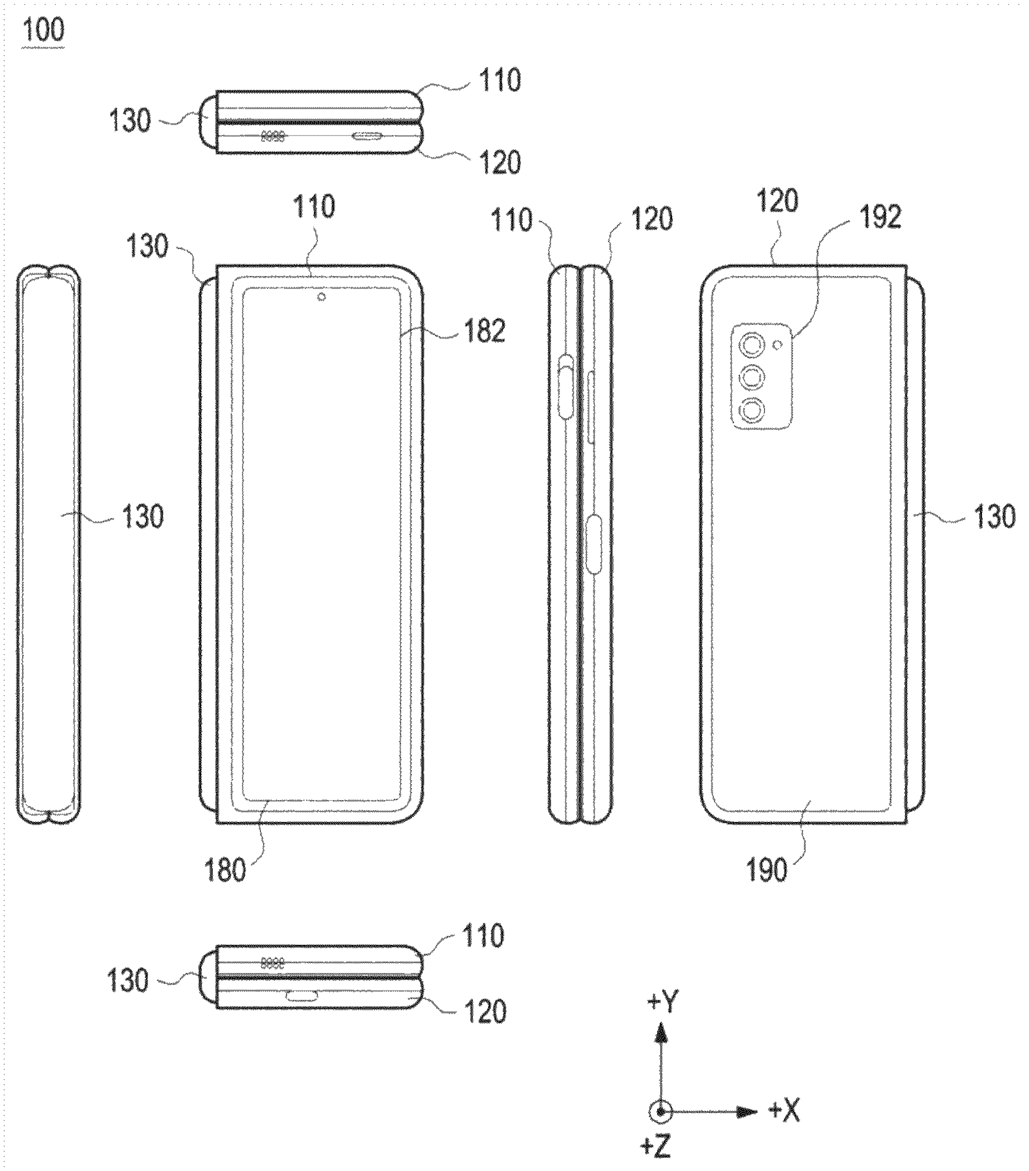
FIG. 2 is a view illustrating a folded state of the electronic device according to an embodiment of the disclosure.

FIG. 1 is a view illustrating an unfolded state of an electronic device according to various embodiments of the disclosure. FIG. 2 is a view illustrating the state in which the electronic device according to various embodiments of the disclosure is folded.

Referring to FIGS. 1 and 2, in an embodiment, an electronic device 100 may include a foldable housing 101, a hinge cover 130 configured to cover the foldable portion of the foldable housing 101, and a flexible or foldable display 200 (hereinafter, simply referred to as a "display" 200) disposed in a space defined by the foldable housing 101. According to an embodiment, the surface on which the display 200 is disposed is defined as the front surface (e.g., a first surface 110*a* and a third surface 120*a*) of the electronic device 100. In addition, a surface opposite to the front surface is defined as the rear surface (e.g., a second surface 110*b* and a fourth surface 120*b*) of the electronic device 100. In addition, a surface surrounding the space between the front and rear surfaces is defined as the side surface (e.g., a first side surface 111*a* and a second side surface 121*a*) of the electronic device 100.

Figure 3:
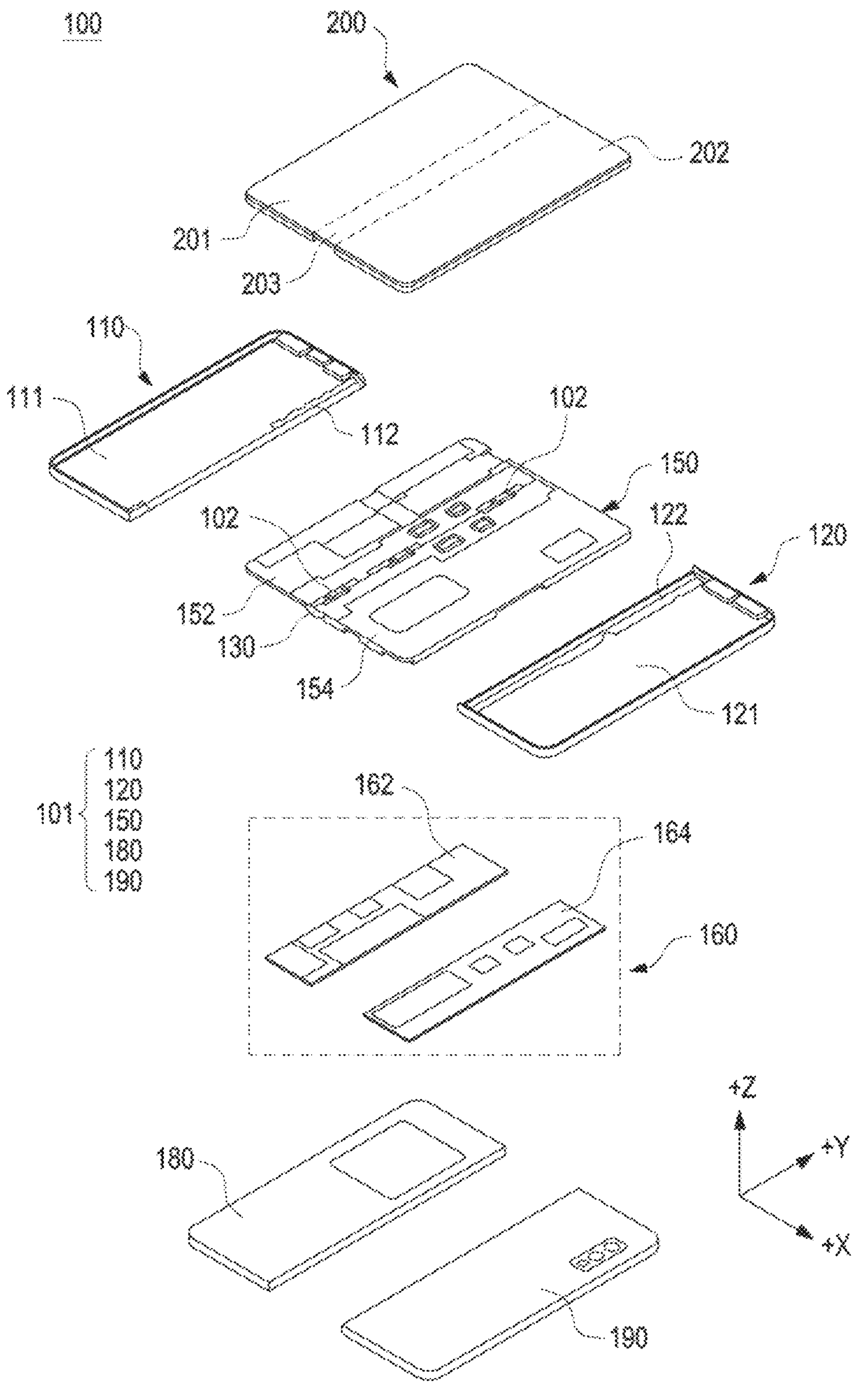
FIG. 3 is an exploded perspective view of the electronic device according to an embodiment of the disclosure.

According to various embodiments, the foldable housing 101 may include a first housing 110, a second housing 120 including a sensor area 124, a first rear cover 180, a second rear cover 190, and a hinge structure (e.g., the hinge structure 102 in FIG. 3). The foldable housing 101 of the electronic device 100 is not limited to the shape and assembly illustrated in FIGS. 1 and 2, but may be implemented by a combination and/or an assembly of different shapes or components. For example, in another embodiment, the first housing 110 and the first rear cover 180 may be integrally configured, and the second housing 120 and the second rear cover 190 may be integrally configured. According to various embodiments, the first housing 110 may be connected to the hinge structure 102, and may include a first surface 110*a* facing a first direction and a third surface 110*b* facing a second direction opposite to the first direction. The second housing 120 may be connected to the hinge structure 102, and may include a second surface 120*a* facing a third direction and a fourth surface 120*b* facing a fourth direction opposite to the third direction. The second housing 120 is rotatable about the hinge structure 102 relative to the first housing 110. Accordingly, the electronic device 100 may be transformable into the folded state or the unfolded state. In the folded state of the electronic device 100, the first surface 110*a* may face the second surface 120*a*, and in the unfolded state, the third direction may be the same as the first direction. According to an embodiment, in the state in which the electronic device 100 is unfolded, the first and third directions may be the +Z direction, and the second and fourth directions may be the −Z direction. According to an embodiment, in the state in which the electronic device 100 is folded, the first and fourth directions may be the +Z direction, and the second and third directions may be the −Z direction. Hereinbelow, unless otherwise stated, directions will be described based on the unfolded state of the electronic device 100.

According to various embodiments, the first housing 110 and the second housing 120 may be disposed on opposite sides about the folding axis A, and may have generally symmetrical shapes with respect to the folding axis A. As will be described later, the angle or distance between the first housing 110 and the second housing 120 may vary depending on whether the electronic device 100 is in the unfolded state, in the folded state, or in the intermediate state. According to an embodiment, unlike the first housing 110, the second housing 120 may further include the sensor area 124 in which various sensors are disposed. However, the first housing 110 and the second housing 120 may have mutually symmetrical shapes in other areas. According to an embodiment, the folding axis A may be multiple (e.g., two) parallel folding axes. For example, the electronic device 100 may be a multi-foldable electronic device including three or more housings and including multiple folding axes.

According to various embodiments, the first housing 110 and the second housing 120 may define together a recess that accommodates the display 200.

According to various embodiments, at least a portion of the first housing 110 and at least a portion of the second housing 120 may be made of a metal material or a non-metal material having the rigidity of a level selected to support the display 200. The at least a portion made of the metal material may provide a ground plane of the electronic device 100, and may be electrically connected to a ground line provided on a printed circuit board (e.g., the printed circuit board 160 in FIG. 3).

According to various embodiments, the sensor area 124 may be configured to have a predetermined area adjacent to a corner and/or an edge of the second housing 120. However, the arrangement, shape, and size of the sensor area 124 are not limited to the illustrated example. For example, in another embodiment, the sensor area 124 may be provided in any area between another corner or an upper end corner and a lower end corner of the second housing 120 or in the first housing 110. In an embodiment, components embedded in the electronic device 100 to execute various functions may be exposed to the front surface of the electronic device 100 through the sensor area 124 or one or more openings provided in the sensor area 124. In various embodiments, the components may include various types of sensors. The sensors may include at least one of, for example, a front camera, a receiver, or a proximity sensor.

According to various embodiments, the first rear cover 180 may be disposed at one side of the folding axis A on the rear surface of the electronic device 100, and may have, for example, a substantially rectangular periphery, which may be surrounded by the first housing 110. Similarly, the second rear cover 190 may be disposed at the other side of the folding axis A on the rear surface of the electronic device 100, and the periphery of the second rear cover 390 may be surrounded by the second housing 120.

According to various embodiments, the first rear cover 180 and the second rear cover 190 may have substantially symmetrical shapes about the folding axis (the axis A). However, the first rear cover 180 and the second rear cover 190 do not necessarily have mutually symmetrical shapes. In another embodiment, the electronic device 100 may include the first rear cover 180 and the second rear cover 190 having various shapes.

According to various embodiments, the first rear cover 180, the second rear cover 190, the first housing 110, and the second housing 120 may define a space in which various components (e.g., a printed circuit board or a battery) of the electronic device 100 may be disposed. According to an embodiment, one or more components may be disposed or visually exposed on the rear surface of the electronic device 100. For example, at least a portion of a sub-display may be visually exposed through a first rear area 182 of the first rear cover 180. In another embodiment, one or more components or sensors may be visually exposed through a second rear area 192 of the second rear cover 190. In various embodiments, the sensors may include a proximity sensor and/or a rear camera.

According to various embodiments, a front camera exposed to the front surface of the electronic device 100 through the one or more openings provided in the sensor area 124 or a rear camera exposed through the second rear area 192 of the second rear cover 190 may include one or more lenses, an image sensor, and/or an image signal processor. A flash of the rear camera may include, for example, a light-emitting diode or a xenon lamp. In some embodiments, two or more lenses (e.g., an infrared camera, a wide-angle lens, and a telephoto lens), and image sensors may be disposed on one surface of the electronic device 100.

Referring to FIG. 2, the hinge cover 130 may be disposed between the first housing 110 and the second housing 120 and may be configured to cover internal components (e.g., the hinge structure 102 in FIG. 3). According to an embodiment, the hinge cover 130 may be covered by a portion of the first housing 110 and a portion of the second housing 120, or may be exposed to the outside depending on the state of the electronic device 100 (the unfolded state (flat state) or the folded state).

According to an embodiment, as illustrated in FIG. 1, when the electronic device 100 is in the unfolded state, the hinge cover 130 may not be exposed by being covered by the first housing 110 and the second housing 120. As another example, as illustrated in FIG. 2, when the electronic device 100 is in the folded state (e.g., the fully folded state), the hinge cover 130 may be exposed to the outside between the first housing 110 and the second housing 120. As still another example, when the first housing 110 and the second housing 120 are in the intermediate state of being folded with a certain angle therebetween, a portion of the hinge cover 130 may be exposed to the outside between the first housing 110 and the second housing 120. However, the area exposed in this case may be smaller than that in the fully folded state. In an embodiment, the hinge cover 130 may include a curved surface.

According to various embodiments, the display 200 may be disposed on a space defined by the foldable housing 101. For example, the display 200 may be seated in the recess defined by the foldable housing 101, and may constitute most of the front surface of the electronic device 100. Accordingly, the front surface of the electronic device 100 may include the display 200, and partial areas of the first housing 110 and the second housing 120, which are adjacent to the display 200. In addition, the rear surface of the electronic device 100 may include the first rear cover 180, a partial area of the first housing 110 adjacent to the first rear cover 180, the second rear cover 190, and a partial area of the second housing 120 adjacent to the second rear cover 190.

According to various embodiments, the display 200 may be a display including at least a partial area which is deformable into a flat surface or a curved surface. According to an embodiment, the display 200 may include a folding area 203, a first area 201 disposed at one side of the folding area 203 (e.g., the left side of the folding area 203 illustrated in FIG. 2), and a second area 202 disposed at the other side of the folding area 203 (e.g., the right side of the folding area 203 illustrated in FIG. 1).

However, the area division of the display 200 is illustrative, and the display 200 may be divided into multiple areas (e.g., four or more areas or two areas) depending on the structure or functions thereof. For example, in the embodiment illustrated in FIG. 1, the area of the display 200 may be divided by the folding area 203 or the folding axis (the axis A) extending parallel to the Y-axis. However, in another embodiment, the area of the display 200 may be divided based on another folding area (e.g., a folding area parallel to the X-axis) or another folding axis (e.g., a folding axis parallel to the X-axis). According to an embodiment, the display 200 may be coupled to or disposed adjacent to a touch-sensitive circuit, a pressure sensor that is capable of measuring touch intensity (pressure), and/or a digitizer configured to detect a magnetic field-type stylus pen.

According to various embodiments, the first area 201 and the second area 202 may have generally symmetrical shapes about the folding area 203. However, unlike the first area 201, the second area 202 may include a notch or hole structure cut due to the presence of the sensor area 124, but may have a shape symmetric to that of the first area 201 in the area others. In other words, the first area 201 and the second area 202 may include portions having mutually symmetrical shapes and portions having mutually asymmetrical shapes.

Hereinafter, the operations of the first housing 110 and the second housing 120 according to the states of the electronic device 100 (e.g., a flat or unfolded state and a folded state) and respective areas of the display 200 will be described.

According to various embodiments, when the electronic device 100 is in the unfolded state (the flat state) (e.g., FIG. 1), the first housing 110 and the second housing 120 may be disposed to form an angle of 180 degrees therebetween and to face the same direction. The surface of the first area 201 and the surface of the second area 202 of the display 200 form 180 degrees relative to each other, and may face the same direction (e.g., the front direction of the electronic device). The folding area 203 may configure the same plane as the first area 201 and the second area 202.

According to various embodiments, when the electronic device 100 is in the folded state (e.g., FIG. 2), the first housing 110 and the second housing 120 may be disposed to face each other. The surface of the first area 201 and the surface of the second area 202 of the display 200 may face each other while forming a narrow angle (e.g., an angle between 0 and 10 degrees) relative to each other. At least a portion of the folding area 203 may be configured as a curved surface having a predetermined curvature.

According to various embodiments, when the electronic device 100 is in the intermediate state, the first housing 110 and the second housing 120 may be disposed with a certain angle relative to each other. The surface of the first area 201 and the surface of the second area 202 of the display 200 may form an angle larger than that in the folded state and smaller than that in the unfolded state. At least a portion of the folding area 203 may be configured as a curved surface having a predetermined curvature, and the curvature in this case may be smaller than that in the folded state.

FIG. 3 is an exploded perspective view of an electronic device according to various embodiments of the disclosure.

Referring to FIG. 3, the electronic device 100 may include a foldable housing 101, a hinge structure 102, a substrate unit 160, and a display 200. The foldable housing 101 may include a first housing 110, a second housing 120, a bracket assembly 150, a first rear cover 180, and a second rear cover 190. The configuration of the foldable housing 101 and the display 200 of FIG. 3 may be partially or wholly the same as the configuration of the foldable housing 101 and the display 200 of FIG. 1.

According to various embodiments, the bracket assembly 150 may include a first mid plate 152 and a second mid plate 154. A hinge structure 102 may be disposed between the first mid plate 152 and the second mid plate 154. When the hinge structure 102 is viewed from the outside, the hinge structure 102 may be covered by a hinge cover (e.g., the hinge cover 130 in FIG. 3). According to an embodiment, a printed circuit board (e.g., a flexible printed circuit board (FPCB)) may be disposed on the bracket assembly 150 across the first mid plate 152 and the second mid plate 154.

According to various embodiments, the substrate unit 160 may include a first circuit board 162 disposed on the first mid plate 152 and a second circuit board 164 disposed on the second mid plate 154. The first circuit board 162 and the second circuit board 164 may be disposed in a space defined by the bracket assembly 150, the first housing 110, the second housing 120, the first rear cover 180, and the second rear cover 190. Components for implementing various functions of the electronic device 100 may be mounted on the first circuit board 162 and the second circuit board 164.

According to various embodiments, the first housing 110 and the second housing 120 may be assembled to be coupled to the opposite sides of the bracket assembly 150 in the state in which the display 200 is coupled to the bracket assembly 150. According to an embodiment, the first housing 110 may include a first side member 111 surrounding at least a portion of the side surface of the first mid plate 152, and the second housing 120 may include a second side member 121 surrounding at least a portion of the side surface of the second mid plate 154. The first housing 110 may include a first rotation support surface 112, and the second housing 120 may include a second rotation support surface 122, which corresponds to the first rotation support surface 112. The first rotation support surface 112 and the second rotation support surface 122 may include curved surfaces corresponding, respectively, to curved surfaces included in the hinge cover 130. According to an embodiment, the first side member 111 may include a first side surface (e.g., the first side surface 111*a* in FIG. 1) which surrounds at least a portion between the first surface 110*a* and the third surface 110*b* and is perpendicular to the first direction or the second direction. According to an embodiment, the second side member 121 may include a second side surface (e.g., the second side surface 121*a* in FIG. 1) which surrounds at least a portion between the second surface 120*a* and the fourth surface 120*b* and is perpendicular to the third direction or the fourth direction.

According to an embodiment, when the electronic device 100 is in the unfolded state (e.g., the electronic device in FIG. 1), the first rotation support surface 112 and the second rotation support surface 122 may cover the hinge cover 130, and the hinge cover 130 may not be exposed to the rear surface of the electronic device 100 or may be minimally exposed. As still another embodiment, when the electronic device 100 is in the folded state (e.g., the electronic device in FIG. 2), the first rotation support surface 112 and the second rotation support surface 122 may rotate along the curved surfaces included in the hinge cover 130 so that the hinge cover 130 may be exposed to the rear surface of the electronic device 100 as much as possible.

Figure 4:
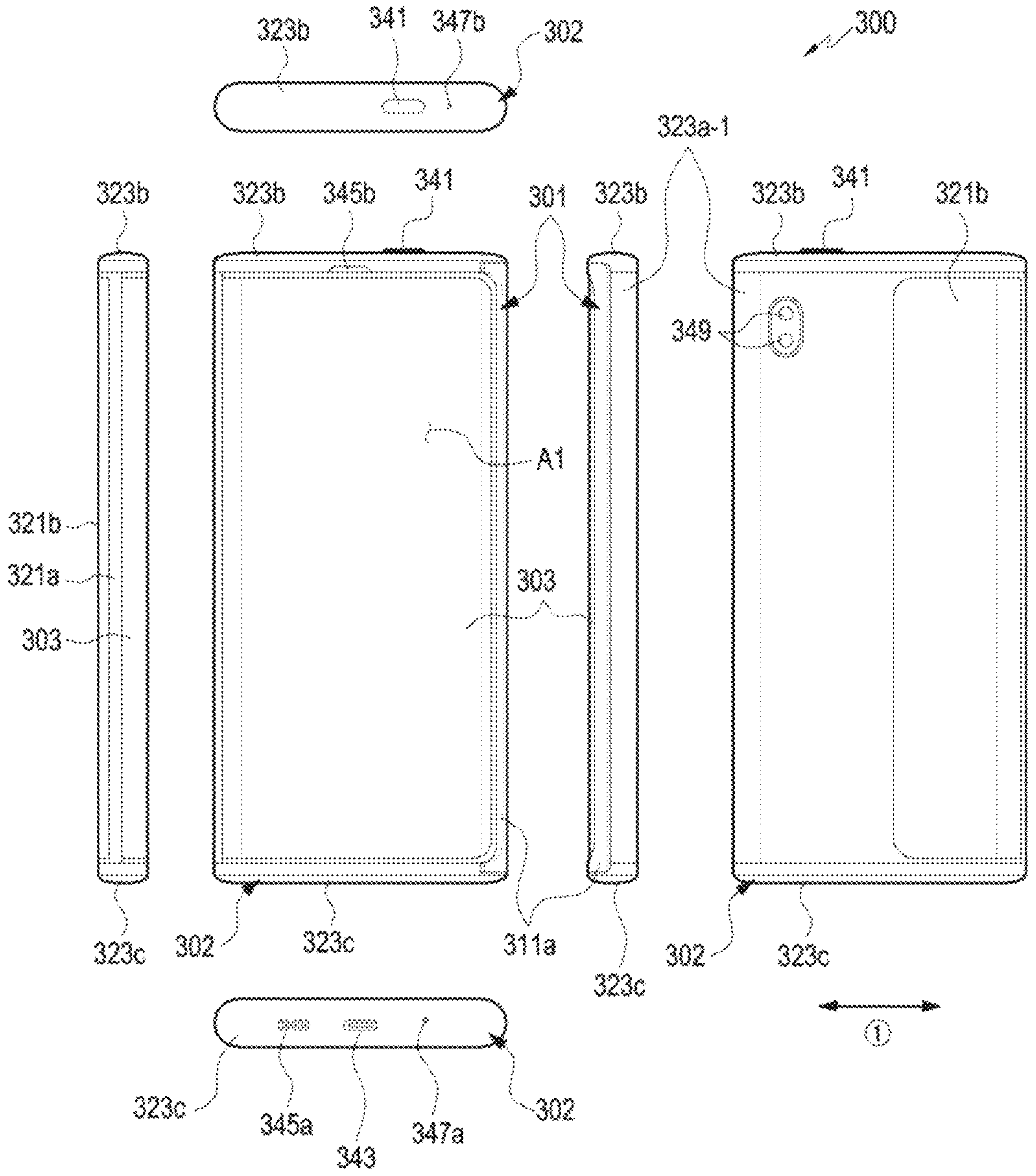
FIG. 4 is a view illustrating an electronic device according to another embodiment of the disclosure in a state in which a portion of a flexible display is accommodated in a second structure.
Figure 5:
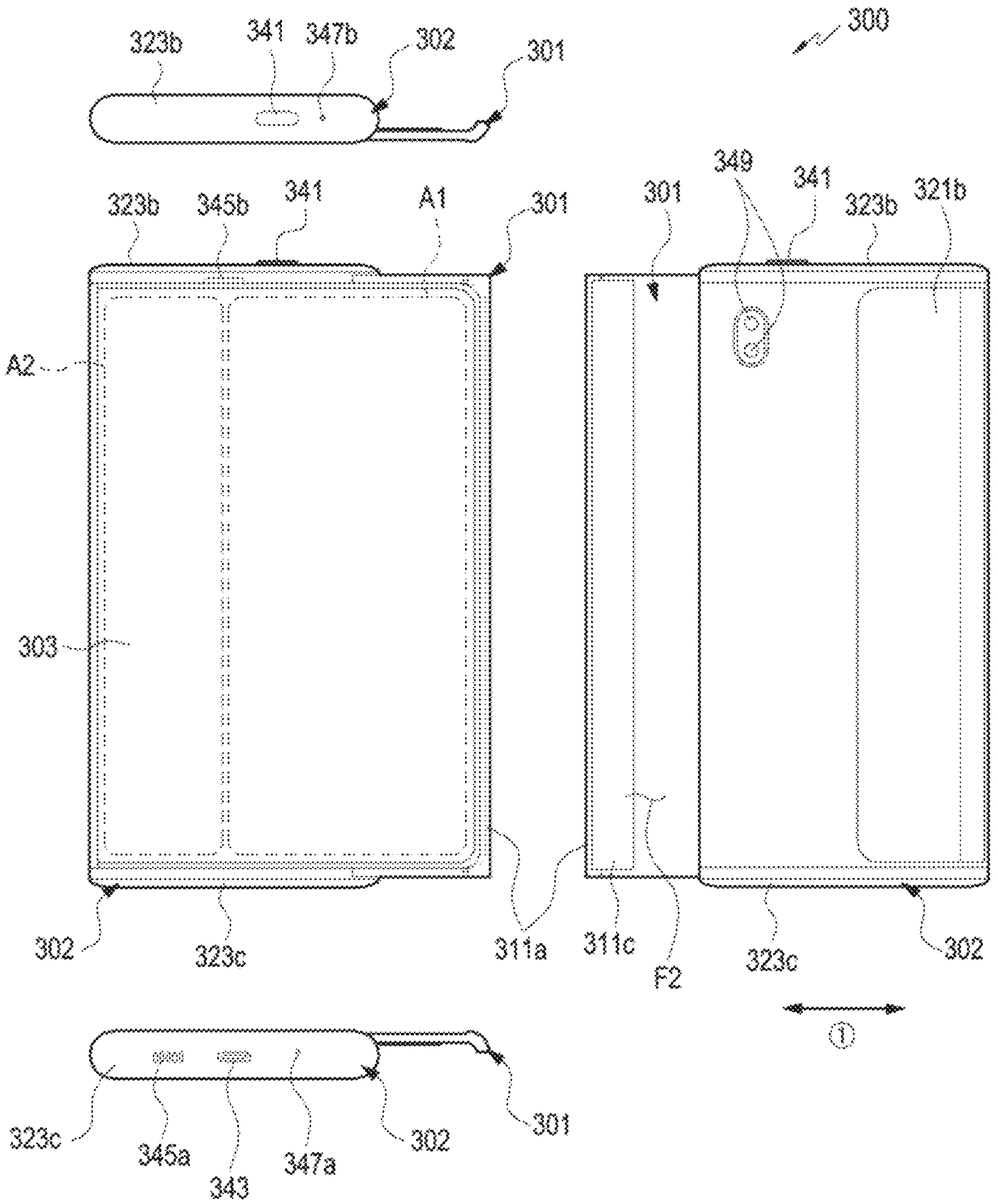
FIG. 5 is a view illustrating the electronic device according to another embodiment of the disclosure in a state in which a portion of a flexible display is exposed to the outside of the second structure.

FIG. 4 is a view illustrating an electronic device 300 according to another embodiment of the disclosure in the state in which a portion of a flexible display is accommodated in a second structure 302. FIG. 5 is a view illustrating an electronic device 300 according to another embodiment of the disclosure in the state in which most of the flexible display is exposed to the outside of the second structure 302.

The configuration of the electronic device 300 of FIGS. 4 and 5 may be wholly or partly the same as that of the electronic device 100 in FIGS. 1 and 2.

The state illustrated in FIG. 4 may be defined as the state in which a first structure 301 is closed with respect to the second structure 302, and the state illustrated in FIG. 5 may be defined as the state in which the first structure 301 is opened with respect to the second structure 302. According to an embodiment, the "closed state" or the "opened state" may be defined as the state in which the electronic device is closed or the state in which the electronic device is opened.

Referring to FIGS. 4 and 5, the electronic device 300 may include a first structure 301 and a second structure 302 disposed to be movable on the first structure 301. In some embodiments, the first structure 301 may be interpreted as a structure disposed to be slidable on the second structure 302. According to an embodiment, the first structure 301 may be disposed to be reciprocable by a predetermined distance in the illustrated direction (e.g., the direction indicated by arrow ①) relative to the second structure 302.

According to various embodiments, the first structure 301 may be referred to as, for example, a first housing, a slide unit, or a slide housing, and may be disposed to be reciprocable on the second structure 302. In an embodiment, the second structure 302 may be referred to as, for example, a second housing, a main unit, or a main housing, and may accommodate various electrical and electronic components such as a main circuit board or a battery. A portion of the display 303 (e.g., the first area A1) may be seated on the first structure 301. In some embodiments, when the first structure 301 moves (e.g., slides) relative to the second structure 302, another portion of the display 303 (e.g., the second area A2) may be accommodated inside the second structure 302 (e.g., a slide-in operation) or exposed to the outside of the second structure 302 (e.g., a slide-out operation).

According to various embodiments, the first structure 301 may include a first plate 311*a* (e.g., a slide plate), and may include a first surface F1 including at least a portion of the first plate 311*a* and a second surface F2 facing away from the first surface F1. According to an embodiment, the second structure 302 may include a second plate 321*a* (e.g., the second plate 321*a* in FIG. 6) (e.g., a rear case), a first side wall 323*a* extending from the second plate 321*a*, a second side wall 323*b* extending from the first side wall 323*a* and the second plate 321*a*, a third side wall 323*c* extending from the first side wall 323*a* and the second plate 321*a* and parallel to the second side wall 323*b*, and/or a rear plate 321*b* (e.g., a rear window). In some embodiments, the second side wall 323*b* and the third side wall 323*c* may be perpendicular to the first side wall 323*a*. According to an embodiment, the second plate 321*a*, the first side wall 323*a*, the second side wall 323*b*, and the third side wall 323*c* may be opened on one side (e.g., the front surface) to accommodate (or surround) at least a portion of the first structure 301. For example, the first structure 301 may be coupled to the second structure 302 in a state of being at least partially surrounded by the same and is slidable in a direction parallel to the first surface F1 or the second surface F2 (e.g., the direction indicated by arrow ①) while being guided by the second structure 302.

According to various embodiments, the second side wall 323*b* or the third side wall 323*c* may be omitted. According to an embodiment, the second plate 321*a*, the first side wall 323*a*, the second side wall 323*b*, and/or the third side wall 323*c* may be configured as separate structures and coupled or assembled to each other. The rear plate 321*b* may be coupled to surround at least a portion of the second plate 321*a*. In some embodiments, the rear plate 321*b* may be substantially integrated with the second plate 321*a*. According to an embodiment, the second plate 321*a* or the rear plate 321*b* may cover at least a portion of the flexible display 303. For example, the flexible display 303 may be at least partially accommodated inside the second structure 302, and the second plate 321*a* or the rear plate 321*b* may cover a portion of the flexible display 303 accommodated inside the second structure 302.

According to various embodiments, the first structure 301 may be movable to an opened state or a closed state relative to the second structure 302 in a direction parallel to the second plate 321*a* (e.g., the rear case) and the second side wall 323*b* (e.g., direction ①), and may be movable such that the first structure 301 is located at a first distance from the first side wall 323*a* in the closed state and at a second distance, which is greater than the first distance, from the first side wall 323*a* in the opened state. In some embodiments, in the closed state, the first structure 301 may be located to surround a portion of the first side wall 323*a*.

According to various embodiments, the electronic device 300 may include at least one of a display 303, a key input device 341, a connector hole 343, audio modules 345*a*, 345*b*, 347*a*, and 347*b*, or a camera module 349. The electronic device 300 may further include an indicator (e.g., an LED device) or various sensor modules.

According to various embodiments, the display 303 may include a first area A1 and a second area A2. In an embodiment, the first area A1 may extend substantially across at least a portion of the first surface F1 to be disposed on the first surface F1. The second area A2 may extend from the first area A1 and may be inserted or accommodated into the second structure 302 (e.g., a housing) according to the sliding movement of the first structure 301, or may be exposed to the outside of the second structure 302. As will be described later, the second area A2 may be moved while substantially being guided by a roller (e.g., the roller 351 in FIG. 6) mounted in the second structure 302 to be accommodated inside the second structure 302 or exposed to the outside of the second structure 302. For example, while the first structure 301 slides, a portion of the second area A2 may be deformed into a curved shape at a position corresponding to the roller 351.

According to various embodiments, when viewed from above the first plate 311*a* (e.g., the slide plate), if the first structure 301 moves from the closed state to the opened state, the second area A2 may substantially define a plane with the first area A1 while being gradually exposed to the outside of the second structure 302. The display 303 may be coupled to or disposed adjacent to a touch detection circuit, a pressure sensor capable of measuring touch intensity (pressure), and/or a digitizer configured to detect a magnetic field-type stylus pen. In an embodiment, the second area A2 may be at least partially accommodated inside the second structure 302, and a portion of the second area A2 may also be exposed to the outside of the second structure 302 even in the state illustrated in FIG. 4 (e.g., closed state). In some embodiments, irrespective of the closed state or the opened state, a portion of the exposed second area A2 may be located on the roller 351, and at a position corresponding to the roller 351, a portion of the second area A2 may maintain a curved shape.

The key input device 341 may be disposed on the second side wall 323*b* or the third side wall 323*c* of the second structure 302. Depending on the external appearance and use state, the electronic device 300 may be designed such that the illustrated key input device(s) 341 is(are) omitted or an additional key input device(s) is(are) included. In some embodiments, the electronic device 300 may include a key input device, such as a home key button or a touch pad disposed around the home key button. According to another embodiment, at least some of the key input devices 341 may be located in an area of the first structure 301.

According to various embodiments, the connector hole 343 may be omitted in some embodiments, and may accommodate a connector (e.g., a USB connector) for transmitting and receiving power and/or data to and from an external electronic device. The electronic device 300 may include multiple connector holes 343, and some of the connector holes 343 may function as connector holes for transmitting and receiving audio signals to and from an external electronic device. In the illustrated embodiment, the connector holes 343 are disposed in the third side wall 323*c*, but the disclosure is not limited thereto. The connector holes 343 or a connector hole may be disposed in the first side wall 323*a* or the second side wall 323*b*.

According to various embodiments, the audio modules 345*a*, 345*b*, 347*a*, and 347*b* may include speaker holes 345*a* and 345*b* or microphone holes 347*a* and 347*b*. One of the speaker holes 345*a* and 345*b* may be provided as a receiver hole for a voice call, and another one may be provided as an external speaker hole. The microphone holes 347*a* and 347*b* may each include a microphone disposed therein so as to acquire external sound, and in some embodiments, may include multiple microphones disposed therein so as to detect the direction of sound. In some embodiments, the speaker holes 345*a* and 345*b* and the microphone holes 347*a* and 347*b* may be implemented as a single hole, or a speaker may be included without the speaker holes 345*a* and 345*b* (e.g., a piezo speaker). According to an embodiment, the speaker hole indicated by reference numeral "345*b*" may be disposed in the first structure 301 to be used as a voice call receiver hole, and the speaker hole (e.g., an external speaker hole) indicated by reference numeral "345*a*" or the microphone holes 347*a* and 347*b* may be disposed in the second structure 302 (e.g., one of the side surfaces 323*a*, 323*b*, and 323*c*).

The camera module 349 may be provided in the second structure 302 and may photograph a subject from a direction opposite to the first area A1 of the display 303. The electronic device 300 may include multiple camera modules 349. For example, the electronic device 300 may include a wide-angle camera, a telephoto camera, or a close-up camera, and in some embodiments, may measure a distance to a subject by including an infrared projector and/or an infrared receiver. The camera module 349 may include one or more lenses, an image sensor, and/or an image signal processor. The electronic device 300 may further include a camera module (e.g., a front camera) for photographing a subject from a direction opposite to the first area A1 of the display 303. For example, the front camera may be disposed around the first area A1 or in an area overlapping the display 303, and when disposed in the area overlapping the display 303, the front camera may photograph a subject through the display 303.

According to various embodiments, an indicator of the electronic device 300 may be disposed on the first structure 301 or the second structure 302, and may include a light-emitting diode to provide state information of the electronic device 300 as a visual signal. A sensor module of the electronic device 300 may generate an electrical signal or a data value corresponding to an internal operating state of the electronic device 300 or an external environmental state. The sensor module may include, for example, a proximity sensor, a fingerprint sensor, or a biometric sensor (e.g., an iris/face recognition sensor or a heart rate monitor (HRM) sensor). In another embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 6:
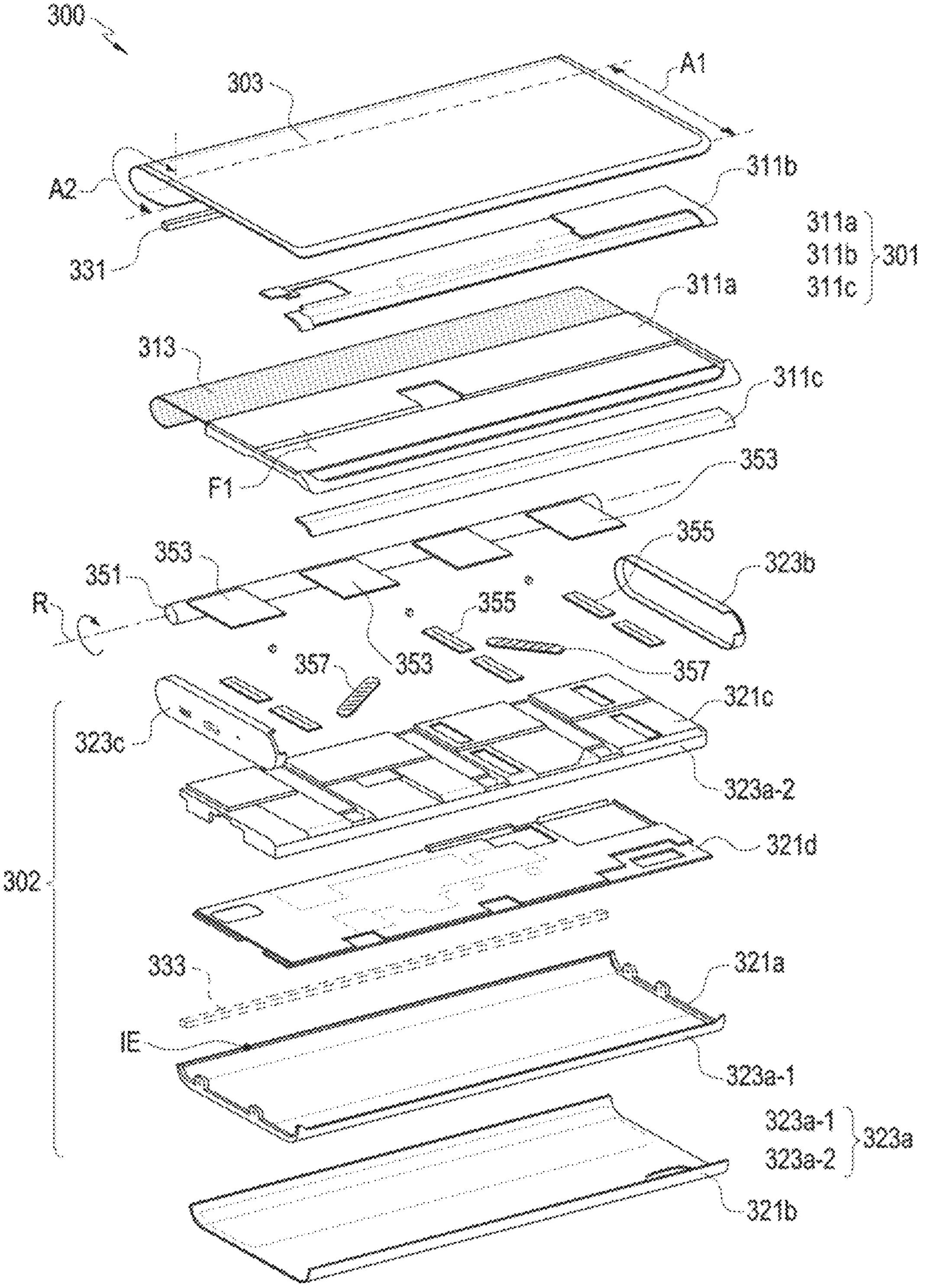
FIG. 6 is an exploded perspective view of the electronic device according to another embodiment of the disclosure.

FIG. 6 is an exploded perspective view of an electronic device according to another embodiment of the disclosure.

Referring to FIG. 6, the electronic device 300 may include a first structure 301, a second structure 302 (e.g., a housing), a display 303 (e.g., a flexible display), a guide member (e.g., a roller 351), a support sheet 353, and/or an articulated hinge structure 313. A portion of the display 303 (e.g., the second area A2) may be accommodated inside the second structure 302 while being guided by the roller 351.

According to various embodiments, the first structure 301 may include a first plate 311*a* (e.g., a slide plate), and a first bracket 311*b* and/or a second bracket 311*c*, which are mounted on the first plate 311*a*. The first structure 301, for example, the first plate 311*a*, the first bracket 311*b*, and/or the second bracket 311*c* may be made of a metal material and/or a non-metal material (e.g., a polymer). The first plate 311*a* may be mounted on the second structure 302 (e.g., a housing) to be linearly reciprocable in one direction (e.g., the direction indicated by arrow ① in FIG. 5) while being guided by the second structure 302. In an embodiment, the first bracket 311*b* may be coupled to the first plate 311*a* to define the first surface F1 of the first structure 301 together with the first plate 311*a*. The first area A1 of the display 303 may be substantially mounted on the first surface F1 to maintain a flat plate shape. The second bracket 311*c* may be coupled to the first plate 311*a* to define the second surface F2 of the first structure 301 together with the first plate 311*a*. According to an embodiment, the first bracket 311*b* and/or the second bracket 311*c* may be configured integrally with the first plate 311*a*. This may be appropriately designed in consideration of the assembly structure or manufacturing process of a manufactured product. The first structure 301 or the first plate 311*a* may be coupled to the second structure 302 to be slidable relative to the second structure 302.

According to various embodiments, the articulated hinge structure 313 may include multiple bars or rods and may be connected to one end of the first structure 301. For example, as the first structure 301 slides, the articulated hinge structure 313 may move relative to the second structure 302, and in the closed state (e.g., the state illustrated in FIG. 4), the first structure 301 may be substantially accommodated inside the second structure 302. In some embodiments, even in the closed state, a portion of the articulated hinge structure 313 may not be accommodated inside the second structure 302. For example, even in the closed state, a portion of the articulated hinge structure 313 may be located to correspond to the roller 351 outside the second structure 302. The multiple rods may linearly extend to be disposed parallel to the rotation axis R of the roller 351, and may be arranged in a direction perpendicular to the rotation axis R, for example, the direction in which the first structure 301 slides.

According to various embodiments, each rod may orbit around another adjacent rod while maintaining the state parallel to the other adjacent rod. Accordingly, as the first structure 301 slides, the multiple rods may be arranged to define a curved shape or a flat shape. For example, as the first structure 301 slides, the articulated hinge structure 313 may define a curved surface in a portion facing the roller 351, and the articulated hinge structure 313 may define a flat surface in a portion not facing the roller 351. In an embodiment, the second area A2 of the display 303 may be mounted or supported on the articulated hinge structure 313, and in the opened state (e.g., the state illustrated in FIG. 5), the second area A2 of the display 103 may be exposed to the outside of the second structure 302 together with the first area A1. In the state in which the second area A2 is exposed to the outside of the second structure 302, the articulated hinge structure 313 may support or maintain the second area A2 in the flat state by defining a substantially flat surface.

According to various embodiments, the second structure 302 (e.g., a housing) may include a second plate 321*a* (e.g., a rear case), a printed circuit board, a rear plate 321*b*, a third plate (321*c*) (e.g., a front case), and a support member 321*d*. The second plate 321*a* (e.g., the rear case) may be disposed to face away from the first surface F1 of the first plate 311*a* and may substantially provide the external shape of the second structure 302 or the electronic device 300. In an embodiment, the second structure 302 may include a first side wall 323*a* extending from the second plate 321*a*, a second side wall 323*b* extending from the second plate 321*a* to be substantially perpendicular to the first side wall 323*a*, and a third side wall 323*c* extending from the second plate 321*a* to be substantially perpendicular to the first side wall 323*a* and parallel to the second side wall 323*b*. A structure in which the second side wall 323*b* and the third side wall 323*c* are manufactured as parts separate from the second plate 321*a* and mounted on or assembled to the second plate 321*a* is exemplified, but the second side wall 123*b* and the third side wall 123*c* may be manufactured integrally with the second plate 321*a*. The second structure 302 may accommodate an antenna for proximity wireless communication, an antenna for wireless charging, or an antenna for magnetic secure transmission (MST) in a space that does not overlap the articulated hinge structure 313.

According to various embodiments, the rear plate 321*b* may be coupled to the outer surface of the second plate 321*a*, and the rear plate 221*b* may be manufactured integrally with the second plate 321*a* depending on an embodiment. In an embodiment, the second plate 321*a* may be made of a metal or polymer material, and the rear plate 321*b* may be made of a material such as metal, glass, a synthetic resin, or ceramic to provide a decoration effect in the external appearance of the electronic device 300. According to an embodiment, the second plate 321*a* and/or the rear plate 321*b* may be made of a material that transmits light through at least a portion thereof (e.g., an auxiliary display area). For example, in the state in which a portion of the display 303 (e.g., the second area A2) is accommodated in the second structure 302, the electronic device 300 may output visual information using a partial area of the display 303 accommodated inside the second structure 302. The auxiliary display area may provide the visual information output from the area accommodated inside the second structure 302 to the outside of the second structure 302.

According to various embodiments, the third plate 321*c* may be made of a metal or polymer material and may be coupled to the second plate 321*a* (e.g., the rear case), the first side wall 323*a*, the second side wall 323*b*, and/or the third side wall 323*c* to define an internal space of the second structure 302. According to an embodiment, the third plate 321*c* may be referred to as a "front case", and the first structure 301 (e.g., the first plate 311*a*) may slide in the state of substantially facing the third plate 321*c*. In some embodiments, the first side wall 323*a* may be configured by a combination with a first side wall portion 323*a*-1 extending from the second plate 321*a* and a second side wall portion 323*a*-2 disposed at a side edge of the third plate 321*c*. In another embodiment, the first side wall portion 323*a*-1 may be coupled to surround one side edge of the third plate 321*c* (e.g., the second side wall portion 323*a*-2), in which case, the first side wall portion 323*a*-1 itself may form the first side wall 323*a*.

According to various embodiments, the support member 321*d* may be disposed in the space between the second plate 321*a* and the third plate 321*c* and may have a flat plate shape made of a metal or polymer material. The support member 321*d* may provide an electromagnetic shielding structure in the internal space of the second structure 302 or may improve mechanical rigidity of the second structure 302. In an embodiment, when received inside the second structure 302, the articulated hinge structure 313 and/or a partial area (e.g., the second area A2) of the display 303 may be located in a space between the second plate 321*a* and the support member 321*d*.

According to various embodiments, a printed circuit board may be disposed in the space between the third plate 321*c* and the support member 321*d*. For example, the printed circuit board may be accommodated in a space separated, by the support member 321*d*, from the space in which the articulated hinge structure 313 and/or a partial area of the display 303 may be accommodated inside the second structure 302. On the printed circuit board, a processor, a memory, and/or an interface may be mounted. The processor may include at least one of, for example, a central processing unit, an application processor, a graphics processing unit, an image signal processor, a sensor hub processor, or a communication processor.

According to various embodiments, the display 303 may be a flexible display based on an organic light-emitting diode and may be at least partially deformed into a curved shape while being generally maintained in a flat shape. In an embodiment, the first area A1 of the display 303 may be mounted on or attached to the first surface F1 of the first structure 301 to maintain a substantially flat plate shape. The second area A2 extends from the first area A1 and may be supported on or attached to the articulated hinge structure 313. For example, the second area A2 may extend along the slide direction of the first structure 301, may be accommodated inside the second structure 302 together with the articulated hinge structure 313, and may be deformed in an at least partially curved shape according to the deformation of the articulated hinge structure 313.

According to various embodiments, as the first structure 301 slides on the second structure 302, the area of the display 303 exposed to the outside may vary. The electronic device 300 (e.g., a processor) may change the area of the display 303 that is activated based on the area of the display 303 exposed to the outside. For example, in the opened state or at a position intermediate between the closed state and the opened state, the electronic device 300 may activate the area exposed to the outside of the second structure 302 in the total area of the display 303. In the closed state, the electronic device 300 may activate the first area A1 of the display 303 and deactivate the second area A2 of the display 303. In the closed state, when there is no user input for a predetermined period of time (e.g., 30 seconds or 2 minutes), the electronic device 300 may deactivate the entire area of the display 303. In some embodiments, in the state in which the entire area of the display 303 is deactivated, the electronic device 300 may provide visual information through an auxiliary display area (e.g., a portion of the second plate 321*a* and/or the rear plate 321*b* made of a material that transmits light) by activating a partial area of the display 303 as needed (e.g., for providing a notification or a missed call/message arrival notification according to a user setting).

According to various embodiments, in the opened state (e.g., the state illustrated in FIG. 6), substantially the entire area (e.g., the first area A1 and the second area A2) of the display 303 may be exposed to the outside, and the first area A1 and the second area A2 may be disposed to define a flat surface. In an embodiment, even in the opened state, a portion (e.g., one end) of the second area A2 may be located to correspond to the roller 351, and the portion corresponding to the roller 351 in the second area A2 may be maintained in a curved shape. For example, in various embodiments disclosed herein, even if it is stated that "in the opened state, the second area A2 is disposed to define a plane", a portion of the second area A2 may be maintained in a curved shape. Similarly, although it is stated that "in the closed state, the articulated hinge structure 313 and/or the second area A2 are accommodated in the second structure 302", a portion of the articulated hinge structure 313 and/or the second area A2 may be located outside the second structure 302.

According to various embodiments, a guide member (e.g., the roller 351) may be rotatably mounted on the second structure 302 at a position adjacent to one side edge of the second structure 302 (e.g., the second plate 321*a*). For example, the roller 351 may be disposed adjacent to the edge of the second plate 321*a* parallel to the first side wall 323*a* (e.g., the portion indicated by reference numeral "IE"). Although reference numerals are not given in the drawings, another side wall may extend from an edge of the second plate 321*a* adjacent to the roller 351, and the side wall adjacent to the roller 351 may be substantially parallel to the first side wall 323*a*. As mentioned above, the side wall of the second structure 302 adjacent to the roller 351 may be made of a material that transmits light, and a portion of the second area A2 may provide visual information through a portion of the second structure 302 in the state of being accommodated in the second structure 302.

According to various embodiments, one end of the roller 351 may be rotatably coupled to the second side wall 323*b*, and the other end may be rotatably coupled to the third side wall 323*c*. For example, the roller 351 may be mounted on the second structure 302 to be rotatable about a rotation axis R perpendicular to the slide direction of the first structure 301 (e.g., the direction indicated by arrow ① in FIG. 4 or FIG. 5). The rotation axis R may be disposed substantially parallel to the first side wall 323*a*, and may be located, for example, at one side edge of the second plate 321*a* far from the first side wall 323*a*. In an embodiment, the gap provided between the outer circumferential surface of the roller 351 and the inner surface of the edge of the second plate 321*a* may form an inlet through which the articulated hinge structure 313 or the display 303 enters the inside of the second structure 302.

According to various embodiments, when the display 303 is deformed into a curved shape, the roller 351 may suppress excessive deformation of the display 303 by maintaining the radius of curvature of the display 303 to a certain degree. The “excessive deformation” may mean that the display 303 is deformed to have an excessively small radius of curvature to the extent that pixels or signal wires included in the display 303 are damaged. For example, the display 303 may be moved or deformed while being guided by the roller 351 and may be protected from damage due to excessive deformation. In some embodiments, the roller 351 may rotate while the articulated hinge structure 313 or the display 303 is inserted into or extracted from the second structure 302. For example, by reducing rubbing between the articulated hinge structure 313 (or the display 303) and the second structure 302, the roller 351 may enable the articulated hinge structure 313 (or the display 303) to smoothly perform the insertion/extraction operation of the second structure 302.

According to various embodiments, the support sheet 353 may be made of a flexible and somewhat elastic material, for example, a material including an elastic body such as silicone or rubber, may be mounted on or attached to the roller 351, and may be selectively wound around the roller 351 as the roller 351 rotates. Multiple (e.g., four) support sheets 353 may be arranged along the direction of the rotation axis R of the roller 351. For example, the multiple support sheets 353 may be mounted on the roller 351 such that adjacent support sheets 353 are spaced apart from each other by a predetermined interval, and may extend in a direction perpendicular to the rotation axis R. In another embodiment, one support sheet may be mounted on or attached to the roller 351. For example, one support sheet may have a size and shape corresponding to the area in which the support sheets 353 are disposed and the areas between the support sheets 353 in FIG. 6. In this way, the number, size, or shape of the support sheets 353 may be appropriately changed depending on an actually manufactured product. In some embodiments, the support sheets 353 may be rolled on the outer circumferential surface of the roller 351 as the roller 351 rotates or may be spread out from the roller 351 in a flat plate shape from the space between the display 303 and the third plate 321*c*. In another embodiment, the support sheets 353 may be referred to as a “support belt”, an “auxiliary belt”, a “support film”, or an “auxiliary film”.

According to various embodiments, an end of each support sheet 353 may be connected to the first structure 301 (e.g., the first plate 311*a* (e.g., a slide plate)), and the support sheets 353 may be rolled on the roller 351 in the closed state (e.g., the state illustrated in FIG. 4). Accordingly, when the first plate 311*a* moves to the opened state (e.g., the state illustrated in FIG. 5), the support sheet 353 may be gradually located between the second structure 302 (e.g., the third plate 321*c*) and the display 303 (e.g., the second area A2) or between the second structure 302 (e.g., the third plate 321*c*) and the articulated hinge structure 313. For example, the support sheets 353 may be located to at least partially face the articulated hinge structure 313, and may be selectively wound around the roller 351 according to the sliding of the first plate 311*a*. The support sheets 353 may be generally disposed to be in contact with the articulated hinge structure 313, but the portions rolled on the roller 351 may be substantially separated from the articulated hinge structure 313.

According to various embodiments, the gap (e.g., the arrangement gap) between the surface of the display 303 and the inner surface of the edge of the second plate 321*a* may vary depending on the extent to which the support sheets 353 are wound around the roller 351. The smaller the arrangement gap, the easier it is to prevent introduction of external foreign matter. However, when the arrangement gap is excessively small, the display 303 may come into contact with or rub against the second plate 321*a*. When direct contact or rubbing occurs, the surface of the display 303 may be damaged or the sliding operation of the first structure 301 may be hindered.

According to various embodiments, in the closed state, since the support sheets 353 are wound around the roller 351, it is possible to reduce the gap between the surface of the display 303 and the inner surface of the edge of the second plate 321*a* while maintaining the state in which the surface of the display 303 is not in contact with the second plate 321*a*. For example, by reducing the arrangement gap in the closed state, it is possible to block the introduction of external foreign matter into the inside of the second structure 302. In an embodiment, as the first structure 301 (e.g., the first plate 311*a* or the slide plate) gradually moves to the opened state, the support sheets 353 may move away from the roller 351 to gradually move to the space between the second structure 302 (e.g., the second plate 321*a* or the third plate 321*c*) and the articulated hinge structure 313. For example, as the first structure 301 moves to the opened state, the arrangement gap gradually increases so that it is possible to suppress direct rubbing or contact between the display 303 and another structure (e.g., the second plate 321*a*) and to prevent the surface of the display 303 from being damaged due to the rubbing or contact. In some embodiments, the thickness of the support sheet 353 may gradually increase from one end (e.g., the portion fixed to the roller 351) toward the other end (e.g., the portion fixed to the first plate 311*a*). By using this thickness profile of the support sheet 353, it is possible to adjust the arrangement gap in the closed state and the opened state.

According to various embodiments, the electronic device 300 may include at least one elastic member 331 or 333 made of a low-density elastic body, such as a sponge, or a brush. For example, the electronic device 300 may include a first elastic member 331 mounted on one end of the display 303, and may further include a second elastic member 333 mounted on the inner surface of an edge of the second plate 321*a* in some embodiments. The first elastic member 331 may be substantially disposed in the internal space of the second structure 302, and in the opened state (e.g., the state illustrated in FIG. 5), the first elastic member 131 may be located to correspond to the edge of the second plate 321*a*. In an embodiment, the first elastic member 331 may move in the internal space of the second structure 302 according to the sliding of the first structure 301. When the first structure 301 moves from the closed state to the opened state, the first elastic member 331 may move toward the edge of the second plate 321*a*. When the first structure 301 reaches the opened state, the first elastic member 331 may come into contact with the inner surface of the edge of the second plate 321*a*. For example, in the opened state, the first elastic member 331 may seal the gap between the inner surface of the edge of the second plate 321*a* and the surface of the display 303. In another embodiment, when moving from the closed state to the opened state, the first elastic member 331 may move while being in contact with the second plate 321*a* (e.g., slide contact). For example, when foreign matter is introduced into the spacing between the second area A2 and the second plate 321*a* in the closed state, the first elastic member 331 may discharge the foreign matter to the outside of the second structure 302 while moving to the opened state.

According to various embodiments, the second elastic member 333 may be attached to the inner surface at the edge of the second plate 321*a* and may be disposed to substantially face the inner surface of the display 303. In the closed state, the gap (e.g., the arrangement gap) between the surface of the display 303 and the inner surface of the edge of the second plate 321*a* may be substantially determined by the second elastic member 333. According to an embodiment, in the closed state, the second elastic member 333 may substantially seal the arrangement gap by coming into contact with the surface of the display 303. According to an embodiment, the second elastic member 333 may be made of a low-density elastic body, such as a sponge, or a brush, so that the surface of the display 303 may be prevented from being damaged even if the second elastic member 133 comes into direct contact with the display 303. In another embodiment, the arrangement gap may increase as the first structure 301 gradually moves to the opened state. For example, the second area A2 of the display 303 may be gradually exposed to the outside of the second structure 302 without substantially coming into contact with or rubbing against the second elastic member 333. When the first structure 301 reaches the opened state, the first elastic member 331 may come into contact with the second elastic member 333. For example, in the opened state, the first elastic member 331 and the second elastic member 333 may block the introduction of external foreign matter by sealing the arrangement gap.

According to various embodiments, the electronic device 300 may further include a guide rail(s) 355 and/or an actuating member(s) 357. The guide rail(s) 355 may be mounted on the second structure 302 (e.g., the third plate 321*c*) to guide the sliding movement of the first structure 301 (e.g., the first plate 311*a* or slide plate). The actuating member(s) 357 may include a spring or a spring module that provides an elastic force in a direction to move opposite ends thereof away from each other. One end(s) of the actuating member(s) 357 may be rotatably supported by the second structure 302, and the other end(s) may be rotatably supported by the first structure 301. When the first structure 301 slides, the opposite ends of the actuating member(s) 357 may be located closest to each other at any one point between the closed state and the opened state (hereinafter, referred to as the "closest point"). For example, in the section between the closest point and the closed state, the actuating member(s) 357 may provide an elastic force to the first structure 301 in a direction to move toward the closed state and in the section between the closest point and the opened state, the actuating member(s) 357 may provide an elastic force to the first structure 301 in a direction to move toward the opened state.

According to various embodiments, the electronic devices 100 and 300 may be implemented in various form factors. For example, when the electronic device 100 is implemented as a foldable phone, the electronic device 100 may be implemented in an in-folding type foldable phone (e.g., FIGS. 1, 2, and 3), an out-folding type foldable phone, or a multi-folding type foldable phone. The out-folding type foldable phone is a foldable phone including displays facing outward in different directions when the phone is folded, and the multi-folding type foldable phone is a foldable phone that is foldable twice or more and may employ at least one of an in-folding type and an out-folding type. According to an embodiment, when the electronic device 300 is implemented as a rollable phone, the electronic device 300 may be implemented as a sliding-type rollable phone (e.g., FIGS. 4, 5, and 6) or a rolling-type rollable phone.

Figure 7A:
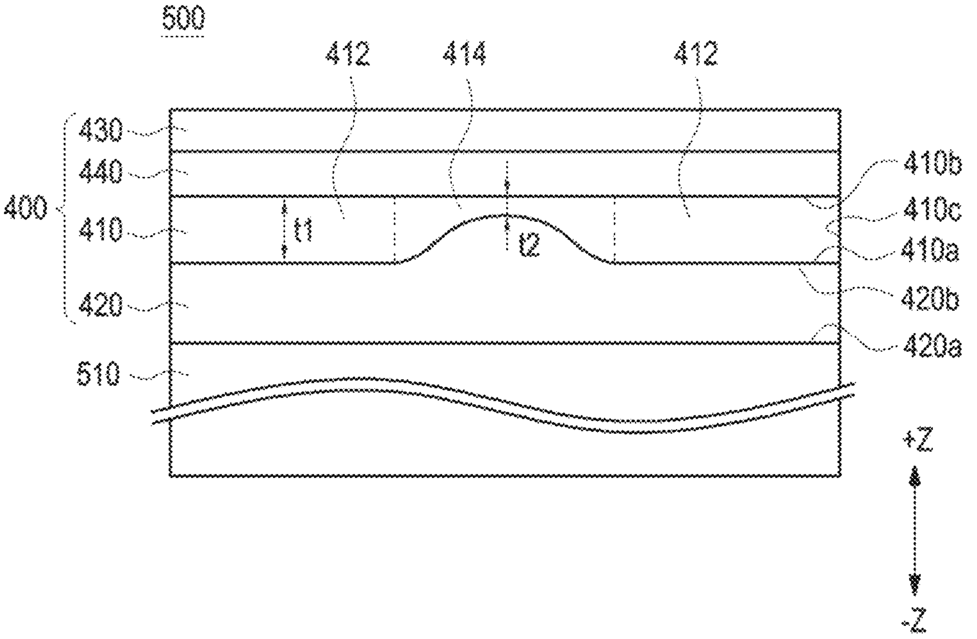
FIGS. 7A, 7B, and 7C are cross-sectional views of a flexible display and a cover window according to various embodiments of the disclosure.
Figure 7B:
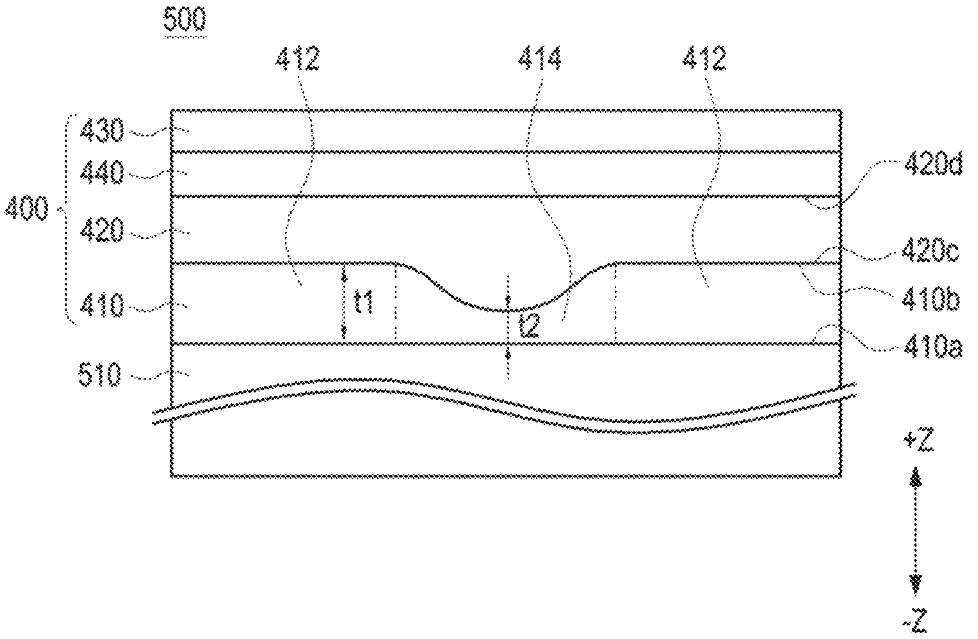
Figure 7C:
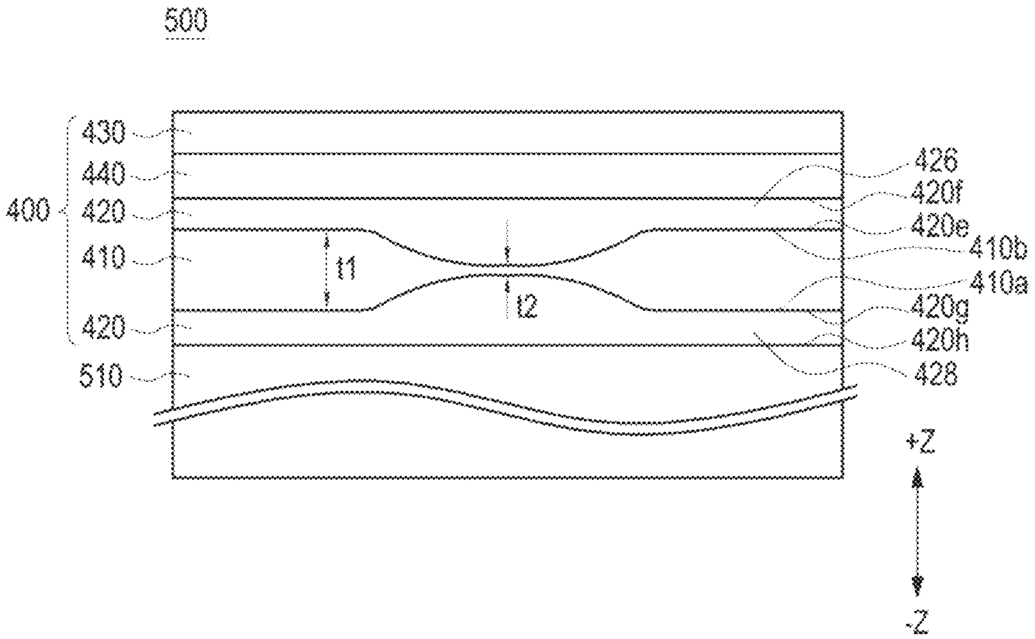
Figure 8:
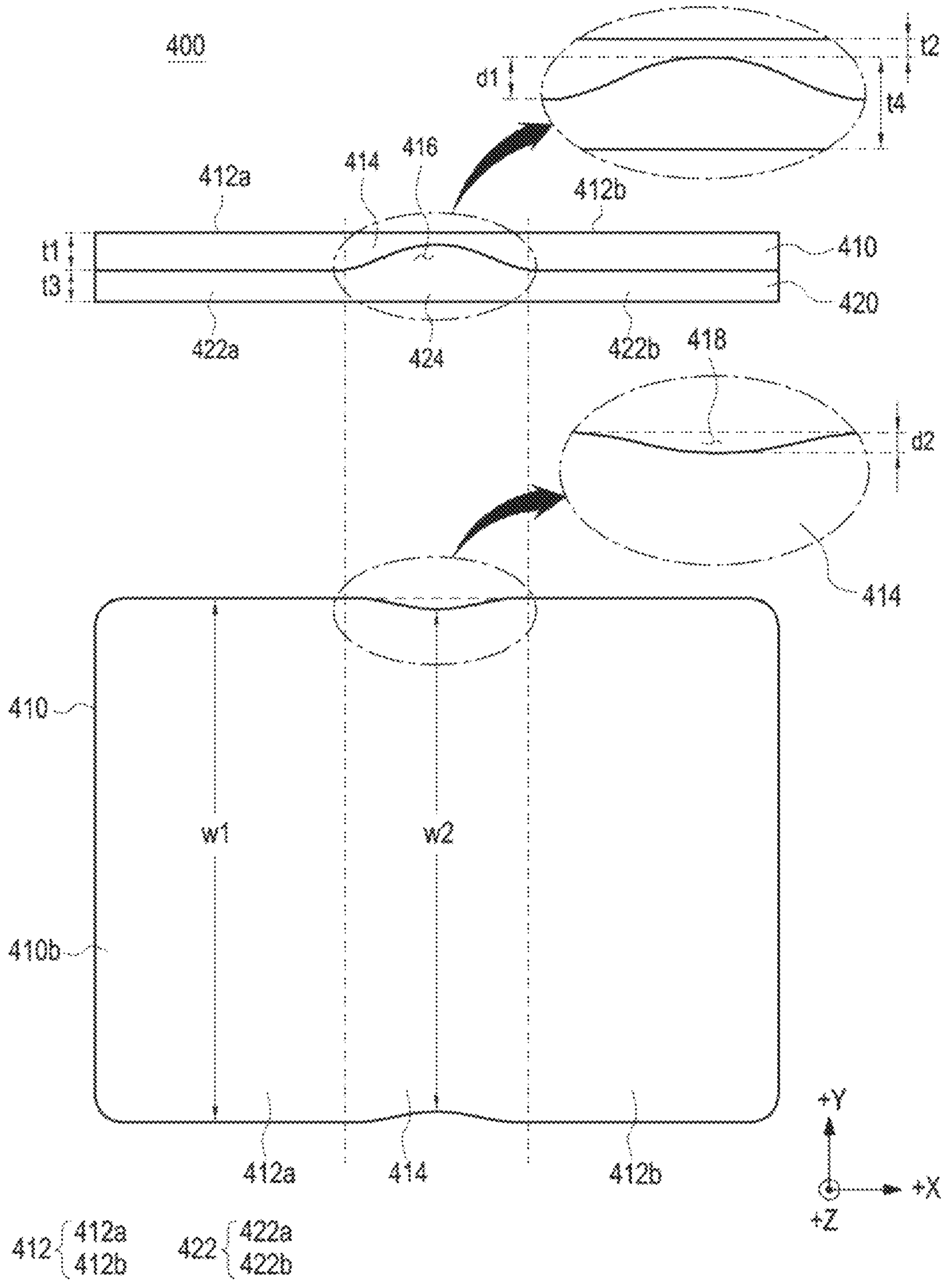
FIG. 8 is a view illustrating a cover window according to an embodiment of the disclosure.
Figure 9:
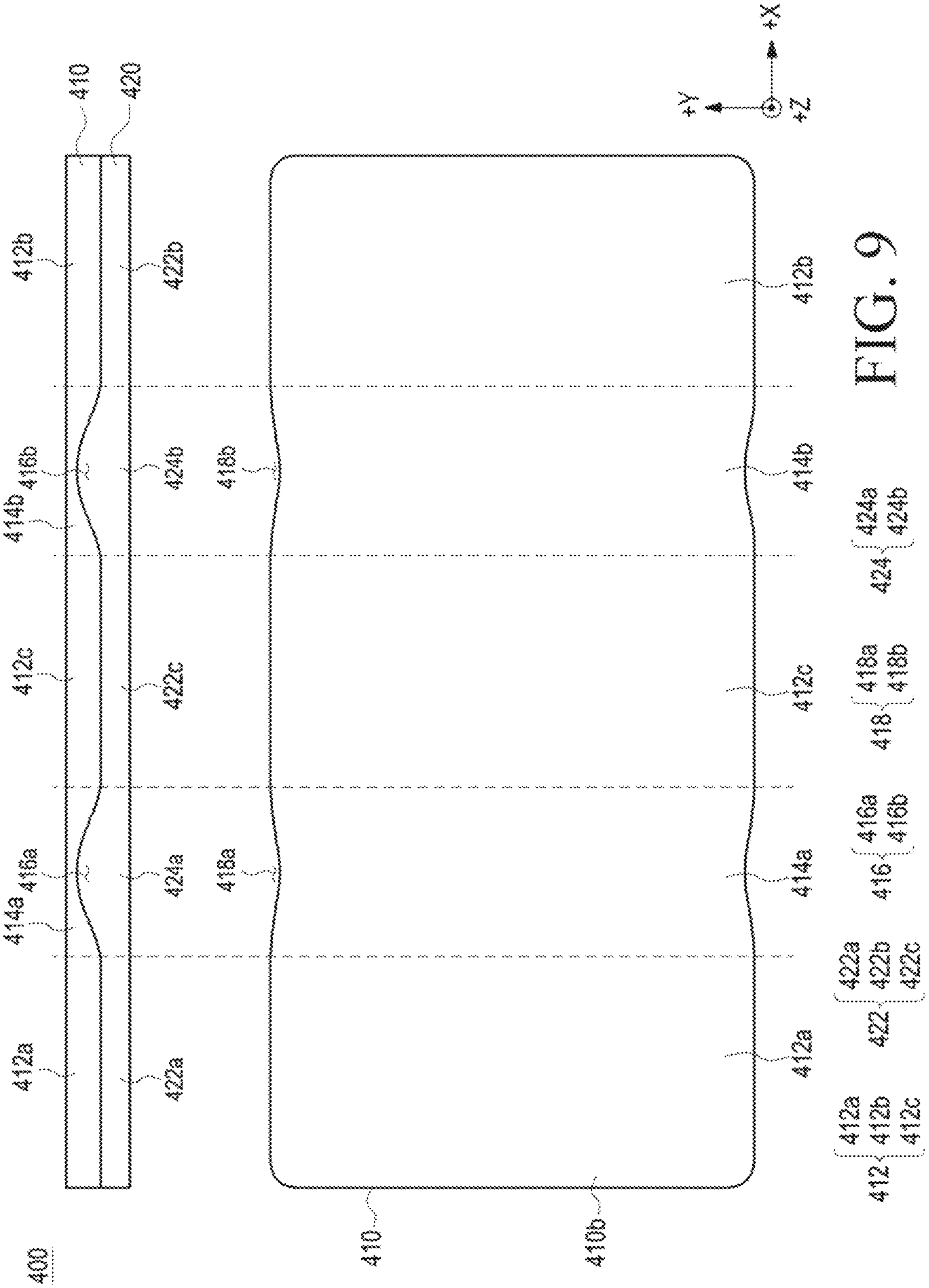
FIG. 9 is a view illustrating a cover window according to another embodiment of the disclosure.
Figure 10:
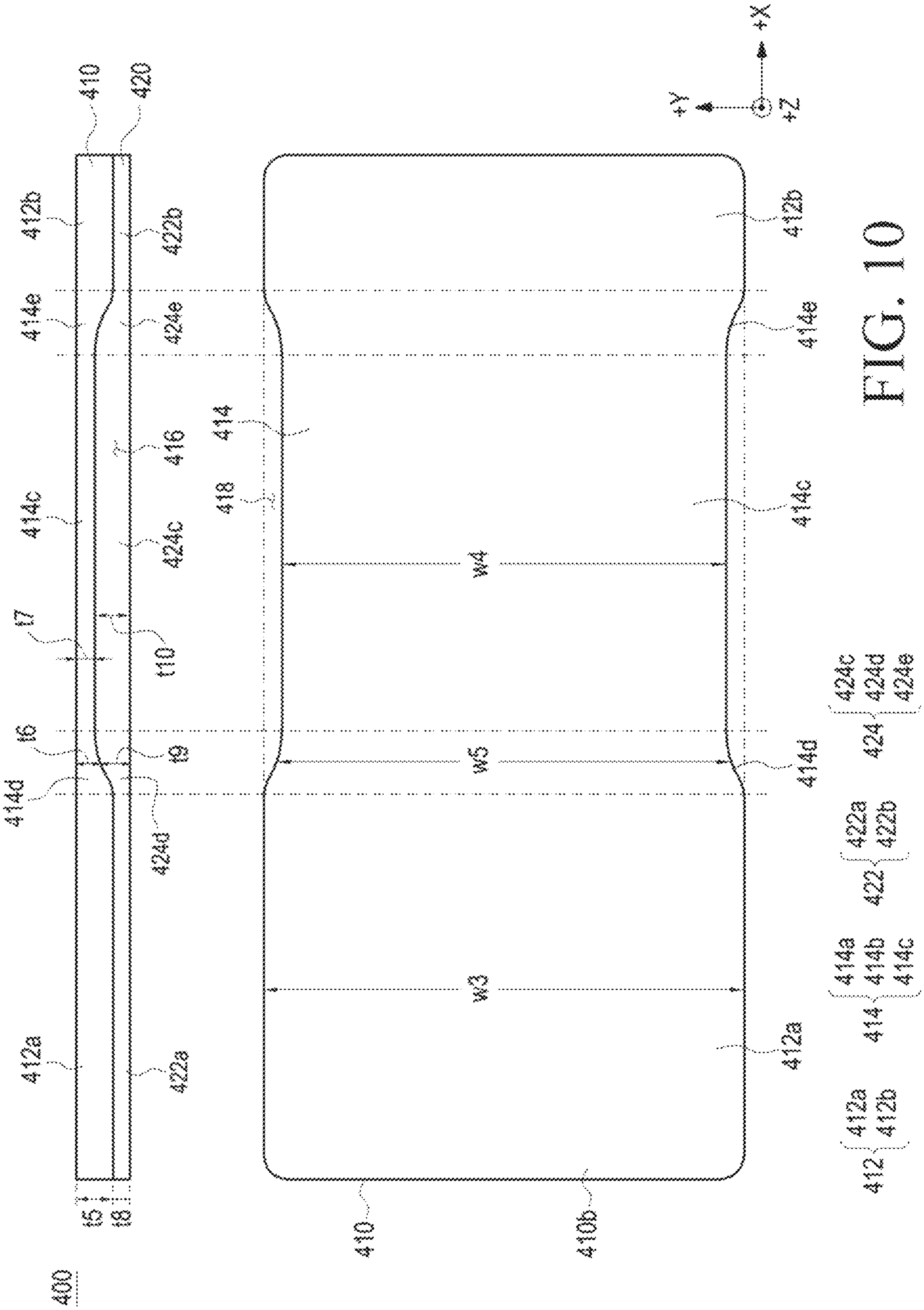
FIG. 10 is a view illustrating a cover window according to another embodiment of the disclosure.

FIGS. 7A, 7B, and 7C are cross-sectional views of a flexible display and a cover window according to various embodiments of the disclosure. FIG. 8 is a front view of a cover window according to an embodiment of the disclosure. FIG. 9 is a view illustrating a cover window according to another embodiment of the disclosure. FIG. 10 is a view illustrating a cover window according to another embodiment of the disclosure.

Referring to FIGS. 7, 8, 9, and 10, an electronic device 500 may include a cover window 400 and a display 510. The configuration of the electronic device 500 of FIGS. 7A, 7B, and 7C may be wholly or partly the same as that of the electronic device 100 of FIG. 1 or the electronic device 300 of FIG. 4, and the configuration of the display 510 of FIGS. 7A, 7B, and 7C may be wholly or partly the same as that of the display 200 of FIG. 1 or the display 303 of FIG. 4.

According to various embodiments, the cover window 400 may be disposed on the display 510. According to an embodiment, the cover window 400 may form at least a portion of an outer surface of the electronic device 500. For example, the cover window 400 may form at least a portion of the front surface (e.g., the first surface 110*a* and the third surface 120*a* in FIG. 1) of the electronic device 500. According to an embodiment, the cover window 400 may cover at least a portion of the display 510 and protect the display 510 from an external impact. According to an embodiment, the display 510 may be visually exposed to the outside of the electronic device 500 through the cover window 400. According to an embodiment, the display 510 may include a cover window 400.

According to various embodiments, the cover window 400 may include a glass member 410. The glass member 410 may be formed of a substantially transparent and flexible material. For example, at least a portion of the glass member 410 may include glass having a bendable thickness (e.g., ultra-thin glass (UTG)).

According to various embodiments, the glass member 410 may include multiple areas having different lengths in thickness and/or width. For example, the glass member 410 may include at least one flat area 412 and at least one bending area 414 extending from the flat area 412. The flat area 412 is an area of the glass member 410 having a substantially uniform thickness and/or width, and the bending area 414 is an area of the glass member 410, which is different from the flat area 412 in thickness and/or width. According to an embodiment, when the electronic device 500 is folded or rolled, the glass member 410 may be bent about the bending area 414. According to an embodiment, when the electronic device 500 and/or the glass member 410 are manufactured, the flat area 412 and the bending area 414 may be bent.

According to various embodiments, when at least a portion of the electronic device 500 is folded or slid, the flat area 412 may not be bent. According to an embodiment, the flat area 412 may face the foldable housing (e.g., the foldable housing 101 in FIG. 1). For example, the first flat area 412*a* may face the first housing (e.g., the first housing 110 in FIG. 1), and the second flat area 412*b* may face the second housing (e.g., the second housing 120 in FIG. 1). According to an embodiment, the flat area 412 may face a second structure (e.g., the second structure 302 in FIG. 4).

According to various embodiments, when the electronic device 500 is folded or slid, the bending area 414 may be bent. According to an embodiment, at least a portion of the bending area 414 may face at least a portion of a hinge structure (e.g., the hinge structure 102 in FIG. 3). According to an embodiment, the bending area 414 may be coupled to a first structure (e.g., the first structure 301 in FIG. 4) or disposed on the first structure 301. For example, at least a portion of the bending area 414 may face an articulated hinge structure (e.g., the articulated hinge structure 313 in FIG. 6).

According to various embodiments, the flat area 412 may include multiple flat areas 412*a* and 412*b*. According to an embodiment (e.g., FIGS. 8 and 10), the flat area 412 may include a first flat area 412*a* and a second flat area 412*b* spaced apart from the first flat area 412*a*. The bending area 414 may be located between the multiple flat areas 412. The first flat area 412*a* and the second flat area 412*b* may be disposed side by side. For example, the first flat area 412*a* and the second flat area 412*b* may be symmetrical with respect to the bending area 414.

According to various embodiments, the glass member 410 may have a structure that is foldable several times to correspond to a multi-foldable device. For example, the glass member 410 may include multiple flat areas 412*a* and 412*b* and multiple bending areas 414*a* and 414*b*. According to an embodiment (e.g., FIG. 9), the flat area 412 may include a first flat area 412*a*, a second flat area 412*b* spaced apart from the first flat area 412*a*, and a third flat area 412*c* spaced apart from the first flat area 412*a* and the third flat area 412*c*, and the bending area 414 may include a first bending area 414*a* and a second bending area 414*b* spaced apart from the first bending area 414*a*. According to an embodiment, the flat areas 412 and the bending areas 414 may be alternately arranged. For example, the third flat area 412*c* may be located between the first bending area 414*a* and the second bending area 414*b*, the first bending area 414*a* may be located between the first flat area 412*a* and the third flat area 412*a*, and the second bending area 414*b* may be located between the second flat area 412*b* and the third flat area 412*c*. According to an embodiment, the multiple flat areas 412*a*, 412*b*, and 412*c* and the multiple bending areas 414*a* and 414*b* may be arranged side by side.

According to various embodiments, the glass member 410 may have a structure that is bendable to correspond to the rollable electronic device (e.g., the electronic device 300 in FIG. 4). For example, the bending area 414 may be configured to be wound around a roller (e.g., roller 351 in FIG. 6). The bending area 414 may include multiple bending areas 414*c*, 414*d*, and 414*e* having different thicknesses and/or widths. According to an embodiment, the bending area 414 may include a third bending area 414*c*, a fourth bending area 414*d* extending from one end of the third bending area 414*c*, and a fifth bending area 414*e* extending from the other end of the third bending area 414*c*. The third bending area 414*c* may be located between the fourth bending area 414*d* and the fifth bending area 414*e*. According to an embodiment, a seventh thickness t7, which is a thickness of the third bending area 414*c*, is substantially uniform with a predetermined length, and a sixth thickness t6, which is the thickness of the fourth bending area 414*d* and/or the fifth bending area 414*e*, may continuously decrease compared to a fifth thickness t5, which is the thickness of the flat areas 412*a* and 412*b*, and may continuously increase compared to the seventh thickness t7. According to an embodiment, a fourth width w4, which is the width of the third bending area 414*c*, is substantially uniform with a predetermined length, and a fifth width w5, which is the width of the fourth bending area 414*d* and/or the fifth bending area 414*e*, may continuously decrease compared to the third width w3, which is the width of the flat areas 412*a* and 412*b*, and may continuously increase compared to the fourth width w4. According to an embodiment, in the glass member 410 of the rollable electronic device 300, the length of the bending area 414 in the horizontal direction (e.g., the X-axis direction) may be greater than the length of the first flat area 412*a* in the horizontal direction (e.g., the X-axis direction) or the length of the second flat area 412*b* in the horizontal direction (e.g., the X-axis direction). A structure in which the thickness (e.g., the second thickness t2 and the sixth thickness t6) and/or the width (e.g., the second width w2 and the fifth width w4) of the bending area 414 continuously vary may be defined as a structure in which the length of the thickness and/or width gradually vary without mechanical steps or irregularities. For example, the surface of the bending area 414 may be substantially uniform. According to various embodiments, at least a portion of the bending area 414 of the glass member 410 may be configured by using a chemical solution. For example, at least a portion of the bending area 414 may include recesses 416 and 418 provided through a reaction with at least one of ammonium fluoride ($NH_4F$), sulfuric acid ($H_2SO_4$), nitric acid ($HNO_3$), silicofluoric acid ($H_2SIF_6$), sodium hydroxide (NaOH), or hydrofluoric acid (HF). According to an embodiment, the recesses 416 and 418 may include a first recess 416 provided in the first surface 410*a* of the bending area 414 and a second recess 418 provided in the edge 410*c* of the bending area 414. The second recess 418 may extend continuously from the first recess 416. For example, the first recess 416 and the second recess 418 may be grooves provided in the edge 410*c* of the bending area 414 of the glass member 410, and may be a single groove provided in the side surface and the second surface 410*b*. According to an embodiment, the first recess 416 may be provided in a thickness direction (e.g., the Z-axis direction), and the second recess 418 may be provided in a vertical direction (e.g., the Y-axis direction).

According to various embodiments, the second thickness t2 of the bending area 414 may be smaller than the first thickness t1 of the flat area 412. The glass member 410 may be bent in the bending area 414 to correspond to a folding or sliding operation of the electronic device 500. According to an embodiment, the first thickness t1 may be substantially uniform with a predetermined length, and the second thickness t2 may be continuously or gradually changed. For example, the second thickness t2, which is the thickness of the bending area 414, may continuously decrease compared to the first thickness t1, which is the thickness of the flat area 412. That is, a thickness of at least a portion of the bending area 414 continuously decreases from a thickness of the flat area 412 as the bending area 414 extends from the flat area 412. According to an embodiment, the first thickness t1 may be 50 μm to 200 μm, and the second thickness t2 may be 30 μm to 50 μm. According to an embodiment, the thickness of the flat area 412 and/or the bending area 414 may be the length of the glass member 410 in the thickness direction (e.g., the Z-axis direction). According to an embodiment, the sum of the thicknesses of the buffer member 420, the coating layer 430, and the scattering prevention film 440 of the cover window 400 may be 100 μm to 200 μm.

According to various embodiments, the second width w2, which is the width of the bending area 414, may be smaller than the first width w1, which is the width of the flat area 412. According to an embodiment, the first width w1 may be substantially uniform with a predetermined length, and the second width w2 may be continuously changed. For example, the second width w2, which is the width of the bending area 414, may continuously or gradually decrease compared to the first width w1, which is the thickness of the flat area 412. That is, a width of the at least the portion of the bending area 414 continuously decreases from a width of the flat area 412 as the bending area 414 extends from the flat area 412. According to an embodiment, the difference between the second width w2 and the first width w1 may be substantially the same as the difference between the second thickness t2 and the first thickness t1. For example, a first length d1, which is a length of the first recess 416 in the thickness direction (e.g., the Z-axis direction), and a second length d2, which is a length of the second recess 418 in the width direction (e.g., the Y-axis direction) of the second recess 418, may be substantially equal to each other. According to an embodiment, the width of the flat area 412 and/or the bending area 414 may be the length of the glass member 410 in the width direction (e.g., the Y-axis direction).

According to various embodiments, the glass member 410 may include a rear surface (e.g., the first surface 410*a* in FIG. 7A) facing the display 510 and a front surface (e.g., the second surface 410*b* in FIG. 7A) facing outward of the electronic device. According to an embodiment (e.g., FIG. 7A), at least a portion of the first surface 410*a* may have a curved shape. For example, the first surface 410*a* may include the first recess 416 in the bending area 414, and the second surface 410*b* may be substantially flat. According to an embodiment (e.g., FIG. 7B), the first surface 410*a* may be substantially flat, and at least a portion of the second surface 410*b* may have a curved shape. For example, the second surface 410*b* may include the first recess 416 in the bending area 414. According to an embodiment (e.g., FIG. 7C), at least a portion of the first surface 410*a* and at least a portion of the second surface 410*b* may have a curved shape. For example, the first surface 410*a* and the second surface 410*b* may include the first recess 416 in the bending area 414.

According to various embodiments, the cover window 400 may include a buffer member 420. According to an embodiment, the buffer member 420 may absorb at least some of the force applied to the display 510 from the outside of the electronic device 500. According to an embodiment, the buffer member 420 may include at least one of an optical clear adhesive (OCA) and a pressure sensitive adhesive (PSA).

According to various embodiments, the buffer member 420 may flatten at least a portion of the cover window 400. For example, the buffer member 420 may be located within the first recess 416 and/or the second recess 418 in the bending area 414 to make the thickness and/or width of the cover window 400 uniform. For example, the sum of the thicknesses of the glass member 410 and the buffer member 420 may be substantially constant. According to an embodiment (e.g., FIG. 7A), at least a portion of the buffer member 420 may be disposed under the glass member 410. For example, the buffer member 420 may include a third surface 420*a* facing the flexible display 510 and a fourth surface 420*b* facing the first surface 410*a* of the glass member 410. The third surface 420*a* may be substantially flat, and the fourth surface 420*b* may have a shape curved to correspond to the shape of the bending area 414. According to an embodiment (e.g., FIG. 7B), at least a portion of the buffer member 420 may be disposed on the glass member 410. For example, the buffer member 420 may include a fifth surface 420*c* facing the glass member 410 and a sixth surface 420*d* facing outward of the electronic device 500. The sixth surface 420*d* may be substantially flat, and the fifth surface 420*c* may have a shape curved to correspond to the shape of the bending area 414. According to one embodiment (e.g., FIG. 7C), buffer members 420 may be disposed above and below the glass member 410, and the glass member 410 is disposed between multiple spaced buffer members 420. For example, the buffer members 420 may include an upper buffer member 426 disposed between the glass member 410 and the scattering prevention film 440 and a lower buffer member 428 disposed between the glass member 410 and the flexible display 510. The upper buffer member 426 may include a seventh surface 420*e* facing the second surface 410*b* of the glass member 410 and an eighth surface 420*f* facing the scattering prevention film 440, and the lower buffer member 428 may include a ninth surface 420*g* facing the first surface 401*a* of the glass member 410 and a tenth surface 420*h* facing the flexible display 510.

According to various embodiments (e.g., FIG. 8), the buffer member 420 may include multiple first buffer member areas 422 located below the multiple flat areas 412*a* and 412*b* (e.g., in the −Z direction) and a second buffer member area 424 located below the bending area 414 (e.g., in the −Z direction). The thickness of the second buffer member area 424 (e.g., a fourth thickness t4) may be greater than the thickness of the first buffer member area 422 (e.g., a third thickness t3). The buffer member 420 may have a shape corresponding to the shapes of the flat area 412 and the bending area 414. For example (e.g., FIG. 9), the first buffer member area 422 may include a $(1\text{-}1)^{th}$ buffer member area 422*a* disposed under the first flat area 412*a*, a $(1\text{-}2)^{th}$ buffer member area 422*b* disposed under the second flat area 412*b*, and a $(1\text{-}3)^{th}$ buffer member area 422*c* disposed under the third flat area 412*c*, and the second buffer member area 424 may include a $(2\text{-}1)^{th}$ buffer member area 424*a* disposed under the first bending area 414*a* and a $(2\text{-}2)^{th}$ buffer member area 424*b* disposed under the second bending area 414*b*. At least a portion of the $(2\text{-}1)^{th}$ buffer member area 424*a* may be located in a $(1\text{-}1)^{th}$ recess 416*a*, and at least a portion of the $(2\text{-}2)^{th}$ buffer member area 424*a* is located in a $(1\text{-}2)^{th}$ recess 416*b*. According to another embodiment (e.g., FIG. 10), the first buffer member area 422 may include a $(1\text{-}1)^{th}$ buffer member area 422*a* disposed under the first flat area 412*a* and a $(1\text{-}2)^{th}$ buffer member area 422*b* disposed under the second flat area 412*b*, the second buffer member area 424 may include a $(2\text{-}3)^{th}$ buffer member area 424*c* disposed under the third bending area 414*c*, a $(2\text{-}4)^{th}$ buffer member area 424*d* disposed under the fourth bending area 414*d*, and a $(2\text{-}5)^{th}$ buffer member area 424*e* disposed under the fifth bending area 414*e*. The thickness of the first buffer member area 422 (e.g., an eighth thickness t8) may be substantially uniform with a predetermined length. The thickness of the second buffer member area 424 may be smaller than the eighth thickness t10. For example, the thickness of the $(2\text{-}3)^{th}$ buffer member area 424*c* (e.g., the tenth thickness t10) may be substantially uniform with a length smaller than the eighth thickness t8, and the thickness of the (2-4)$^{th}$ buffer member area 424*d* and the (2-5)$^{th}$ buffer member area 424*e* (e.g., the ninth thickness t9) may continuously increase compared to the eighth thickness t8 of the first buffer member area 422 and may continuously decrease compared to the tenth thickness t10 of the (2-3)$^{th}$ buffer member area 424*c*. FIGS. 8, 9, and 10 illustrate the buffer member 420 disposed under the glass member 410, but the position of the buffer member 420 is not limited to that under the glass member 410. For example, referring to FIGS. 7B and 7C, the buffer member 420 may be disposed above and/or below the glass member 410.

According to various embodiments, the cover window 400 may include a coating layer 430. According to an embodiment, the coating layer 430 may be located at the outermost portion of the cover window 400 and may protect the cover window 400 and the display 510 from an external impact applied to the electronic device 500. For example, the coating layer 430 may be disposed on the scattering prevention film 440.

According to various embodiments, the cover window 400 may include a scattering prevention film 440. According to an embodiment, the scattering prevention film 440 may reduce scattering of fragments of the glass member 410 when the glass member 410 is broken. According to an embodiment, the scattering prevention film 440 may be disposed on the glass member 410 of the cover window 400. According to an embodiment, the scattering prevention film 440 may be a polyethylene terephthalate (PET) film. According to another embodiment, the cover window 400 may not include the coating layer 430 and the scattering prevention film 440. For example, the glass member 410 may be exposed to the outside of the electronic device 500.

Figure 11A:
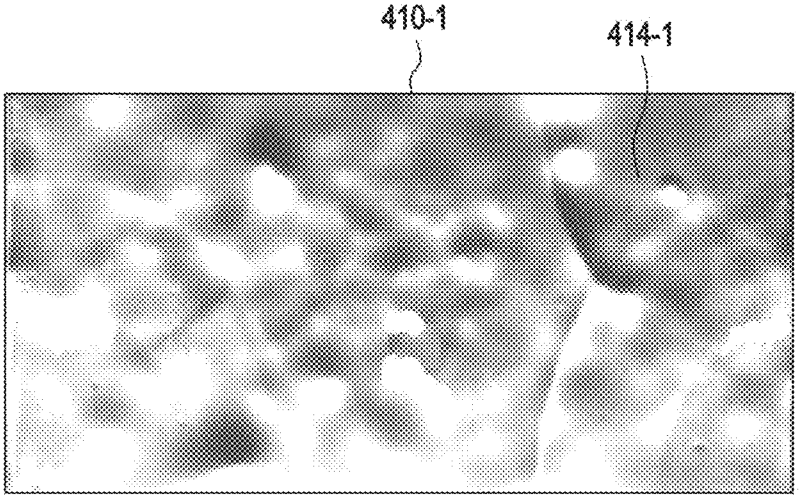
FIG. 11A is an enlarged view of a glass member according to a comparative example.
Figure 11B:
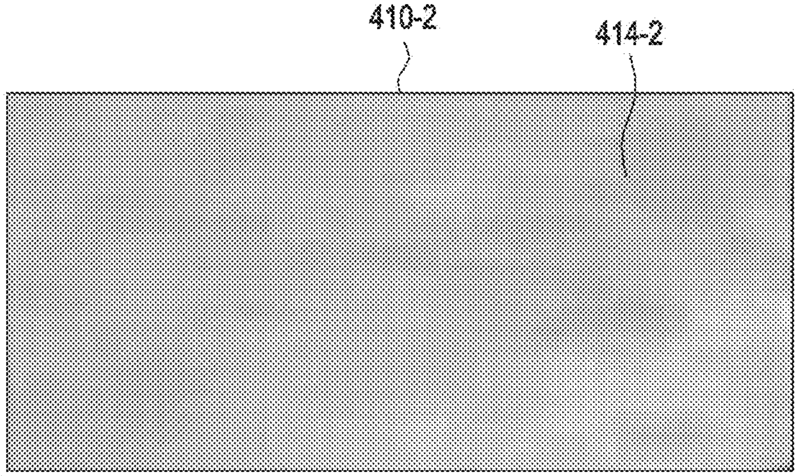
FIG. 11B is an enlarged view of a glass member according to various embodiments of the disclosure.

FIG. 11A is an enlarged view of a glass member according to a comparative embodiment, and FIG. 11B is an enlarged view of a glass member according to various embodiments of the disclosure.

Referring to FIGS. 11A and 11B, the shapes of the surfaces (e.g., the second surface 410*b* of FIGS. 7A-7C) of glass members 410-1 and 410-2 may be determined based on a process of forming a bending area 414.

According to various embodiments, the bending area 414-1 of the glass member 410-1 of FIG. 11A may be made by using a mechanical process. For example, the glass member 410-1 (e.g., the bending area 414-1) may be subjected to a computer numerical control (CNC) process or a polishing process, so that the thickness of a portion of the glass member 410-1 (e.g., the bending area 414-1) may be reduced. According to an embodiment, when the glass member 410-1 is physically processed, subsurface damage (SSD) may occur in the glass member 410-1 due to physical contact. The durability of the glass member 410-1 in which the subsurface damage has occurred may be reduced compared to the durability of the glass member 410-1 before being physically processed. According to an embodiment, when the glass member 410-1 is physically processed, a processing mark may be formed on the surface of the glass member 410-1 by vibration of an external facility that conducts a mechanical process.

Figure 18:
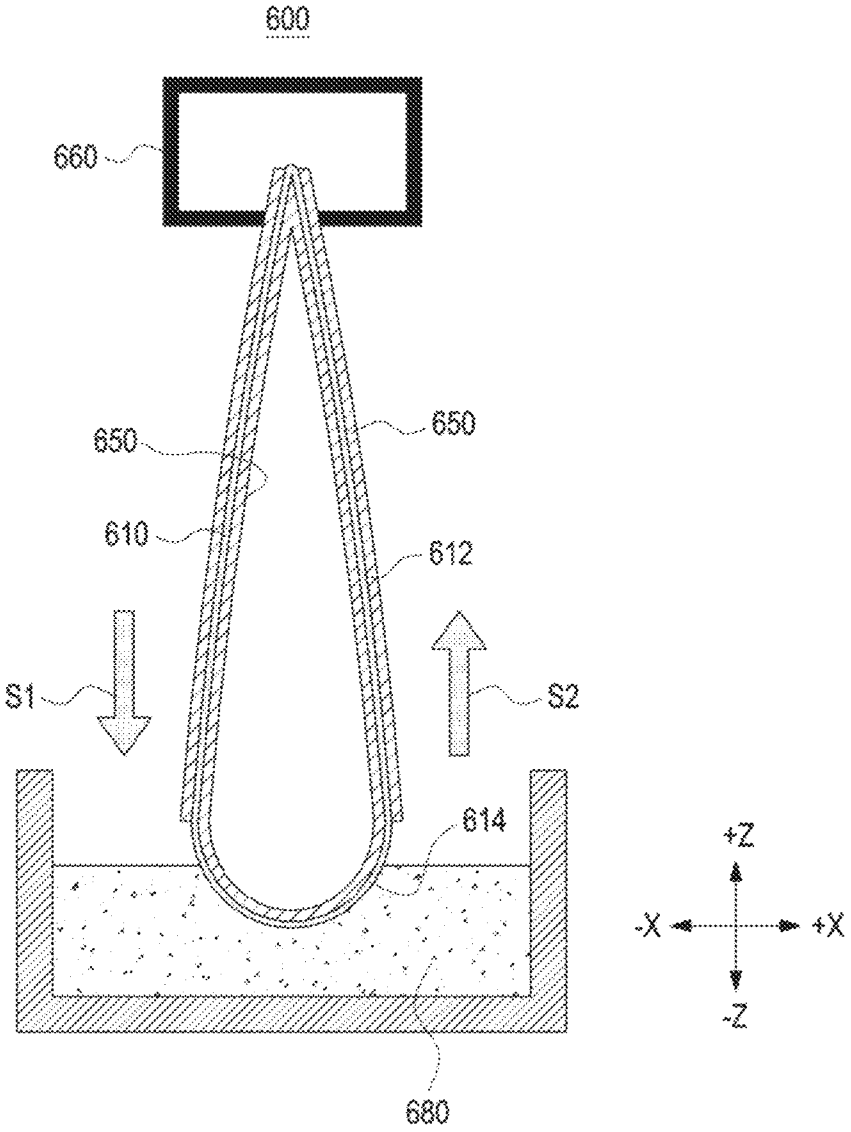
FIGS. 18, 19, and 20 are views for describing a process of dipping the glass member into a chemical solution according to various embodiments of the disclosure.

According to various embodiments, the configuration of the glass member 410-2 of FIG. 11B may be provided by using a chemical solution capable of dissolving glass (e.g., the chemical solution 680 of FIG. 18). For example, the glass member 410-2 may be subjected to a chemical slimming process using a chemical solution capable of dissolving the glass member 410-2 (e.g., the chemical solution 680 in FIG. 18) so that the thickness of a portion of the glass member 410-2 (e.g., the bending area 414-2) may be reduced. According to an embodiment, the chemically processed surface of the glass member 410-2 may be substantially continuous. For example, substantially no subsurface damage may be generated in the chemically processed glass member 410-2. As another example, substantially no processing mark may be generated in the chemically processed glass member 410-2.

Figure 12:
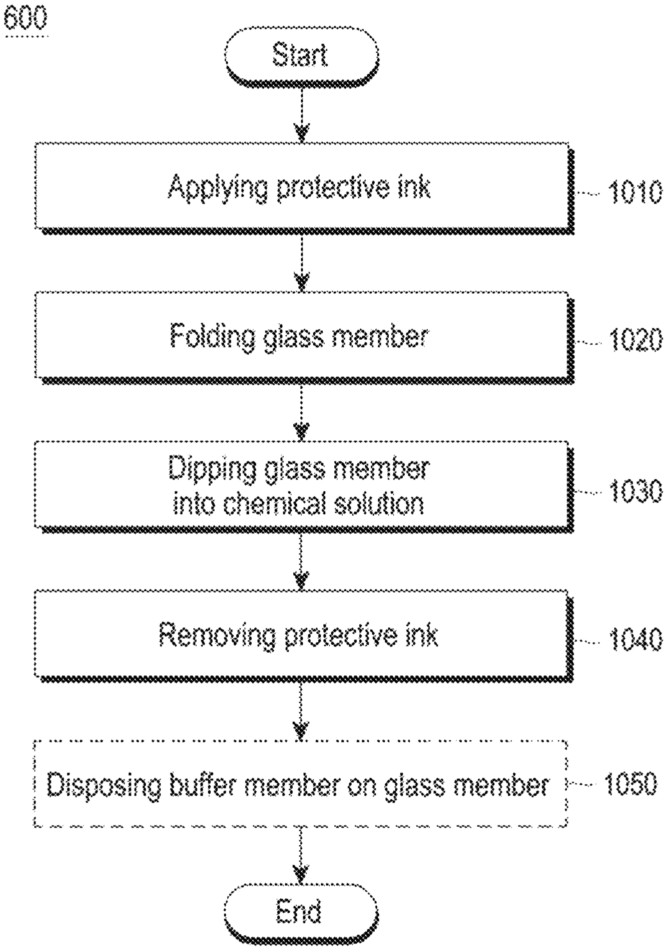
FIG. 12 is a flowchart illustrating a method of manufacturing an electronic device according to various embodiments of the disclosure.
Figure 13:
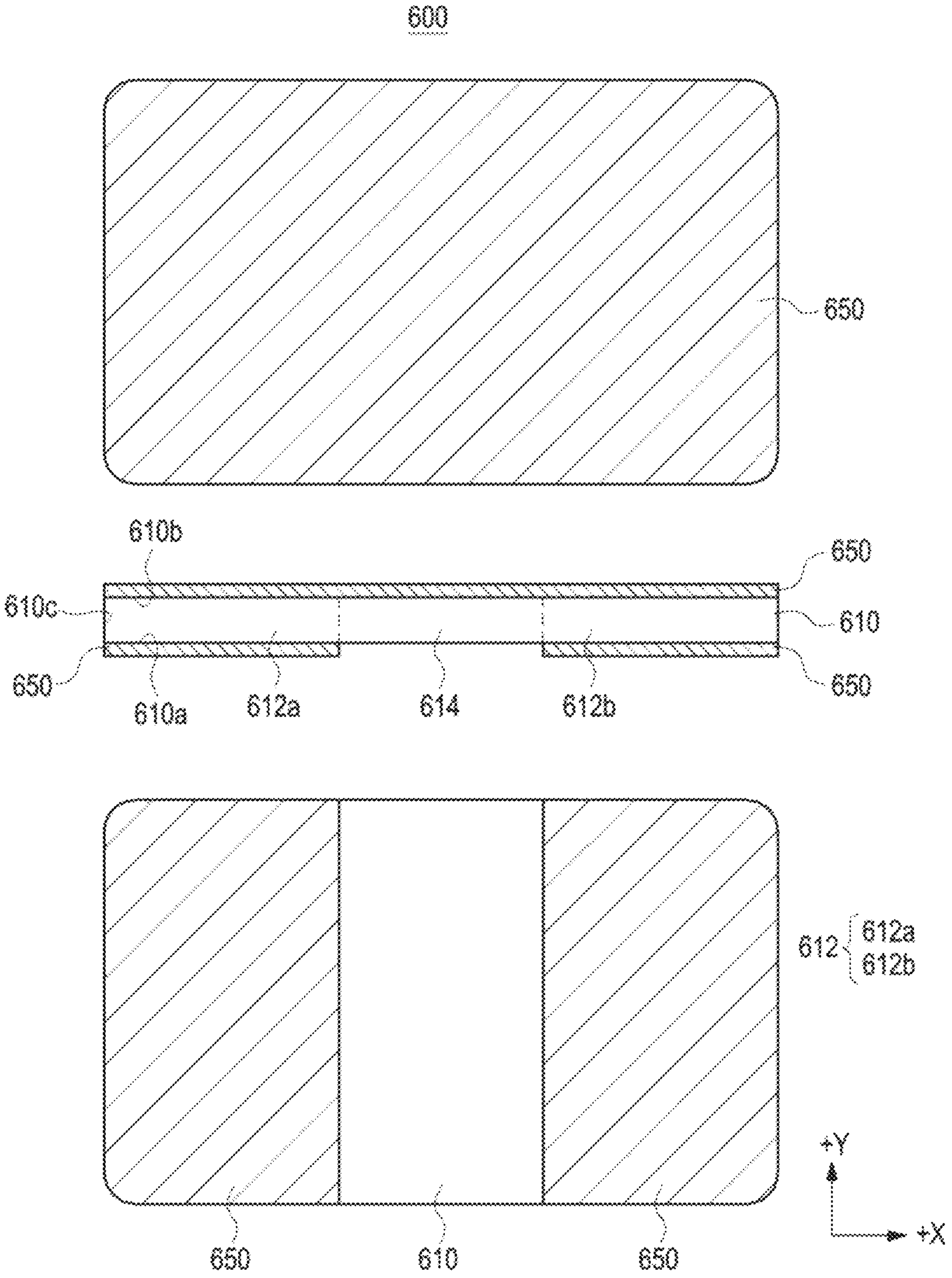
FIGS. 13 and 14 are views for describing a process of applying a protective ink to a glass member according to various embodiments of the disclosure.
Figure 14:
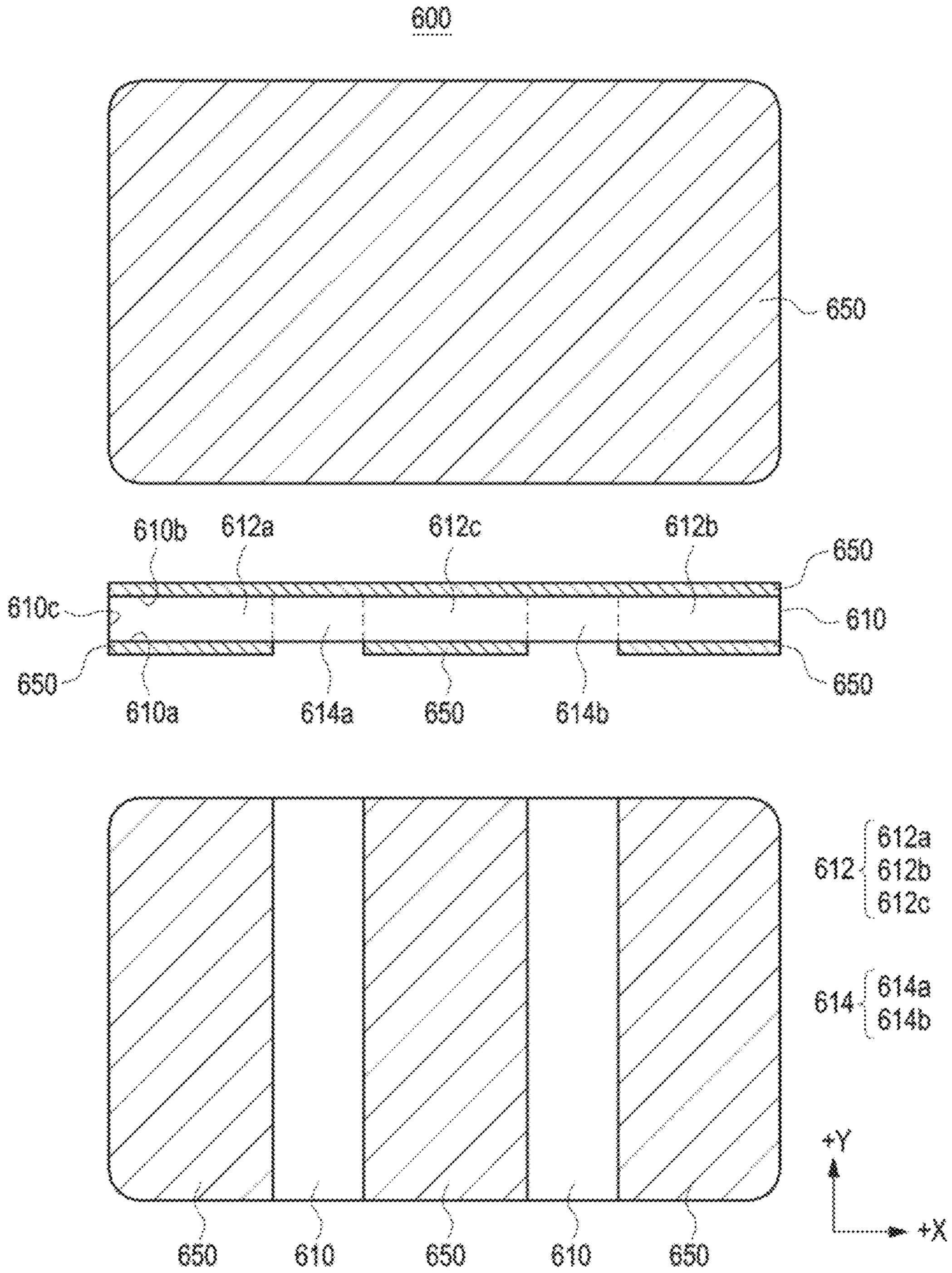
Figure 15:
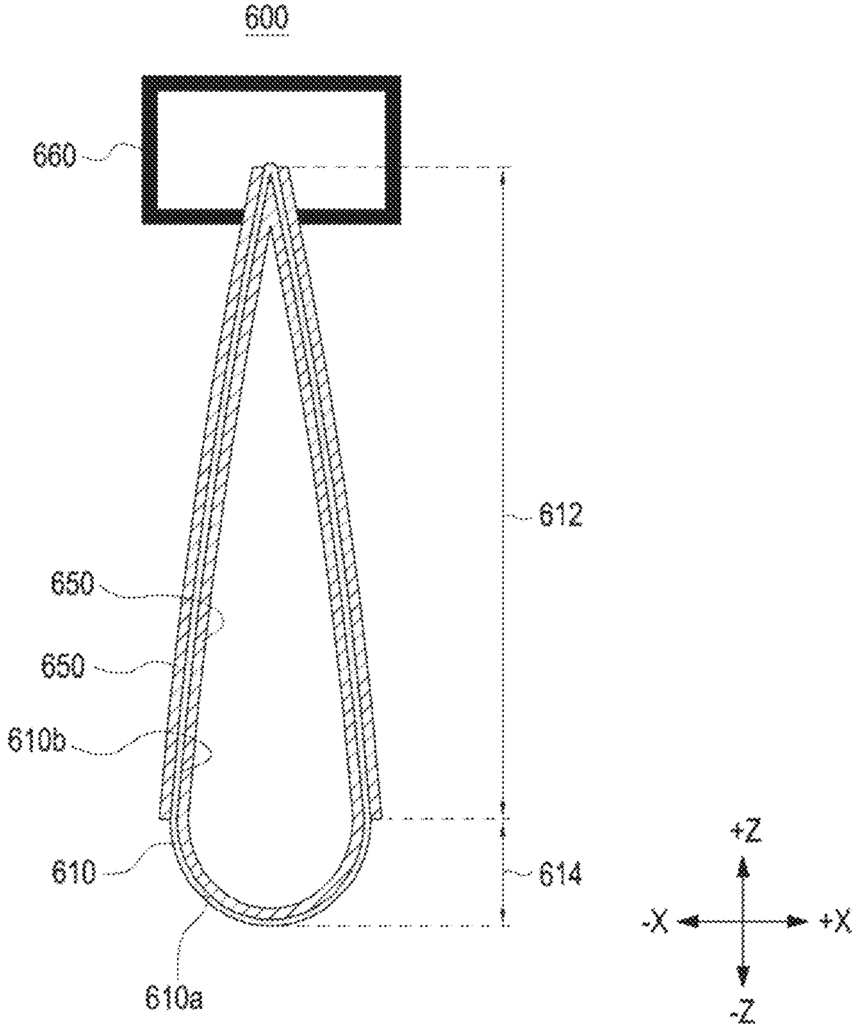
FIGS. 15, 16, and 17 are views for describing a process of folding the glass member according to various embodiments of the disclosure.
Figure 16:
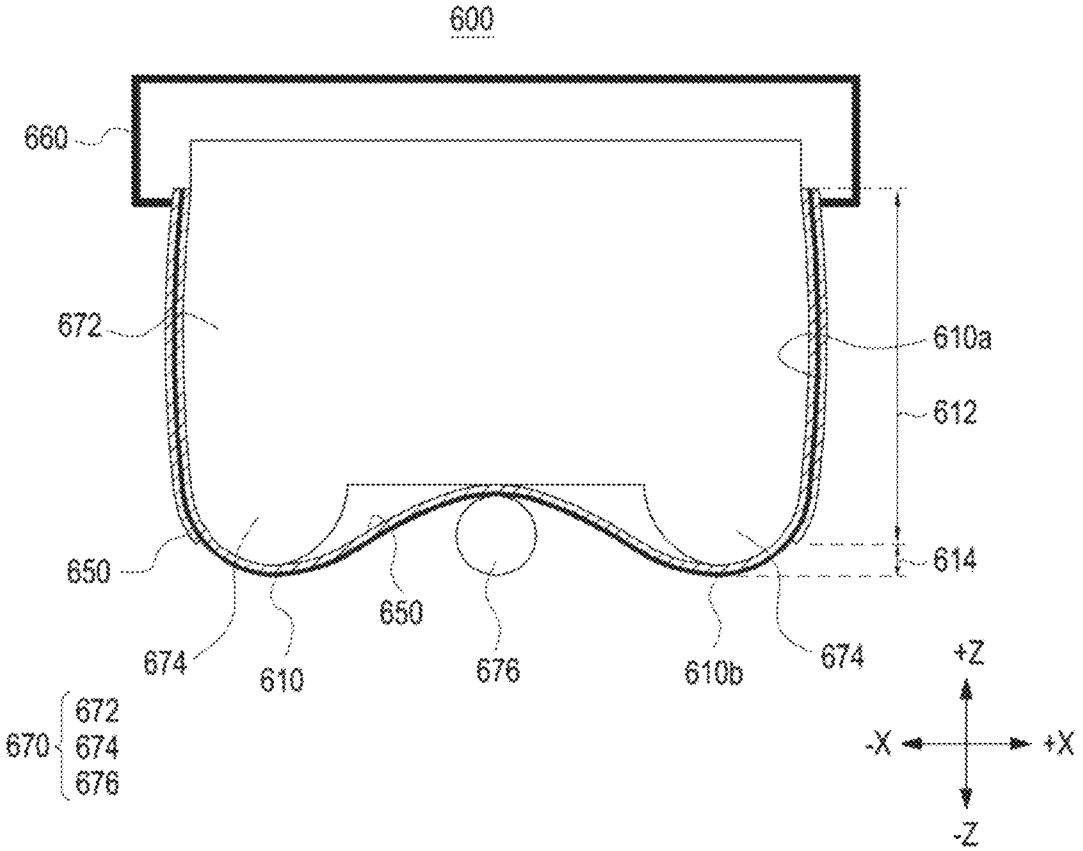
Figure 17:
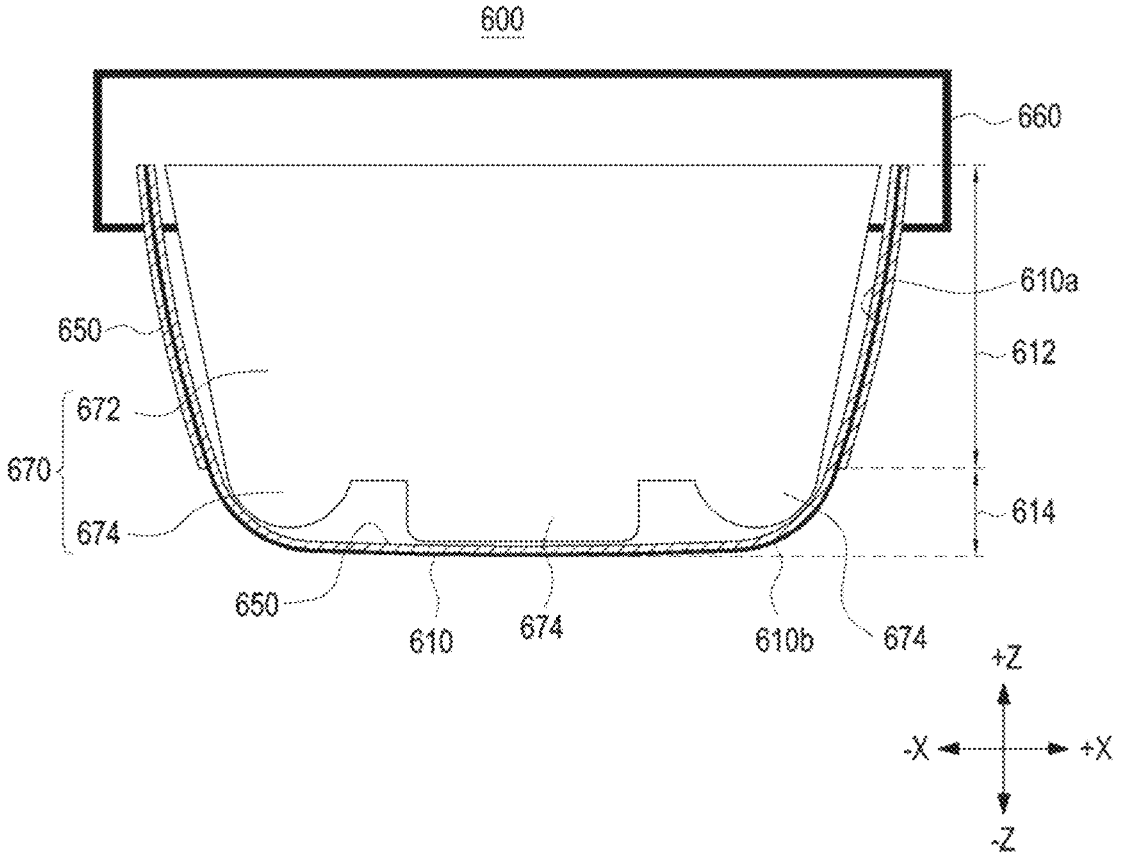
Figure 19:
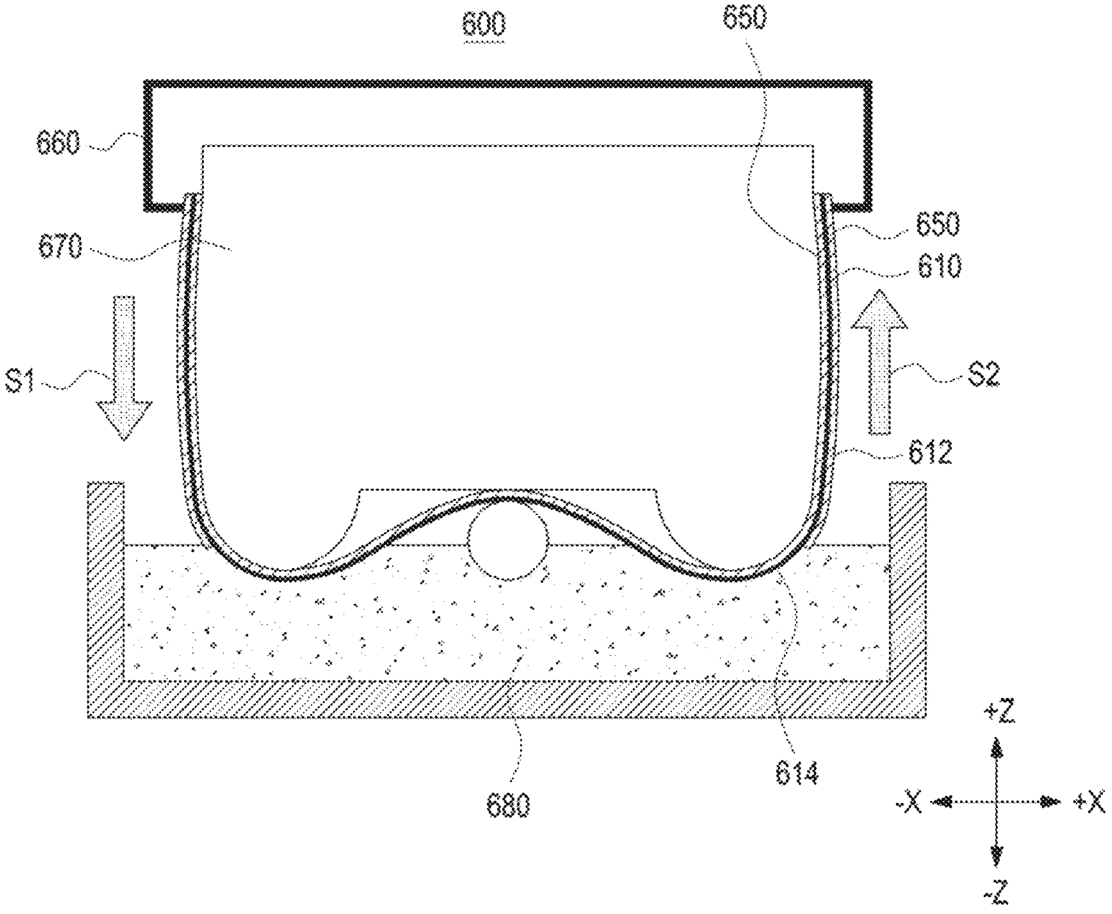
Figure 20:
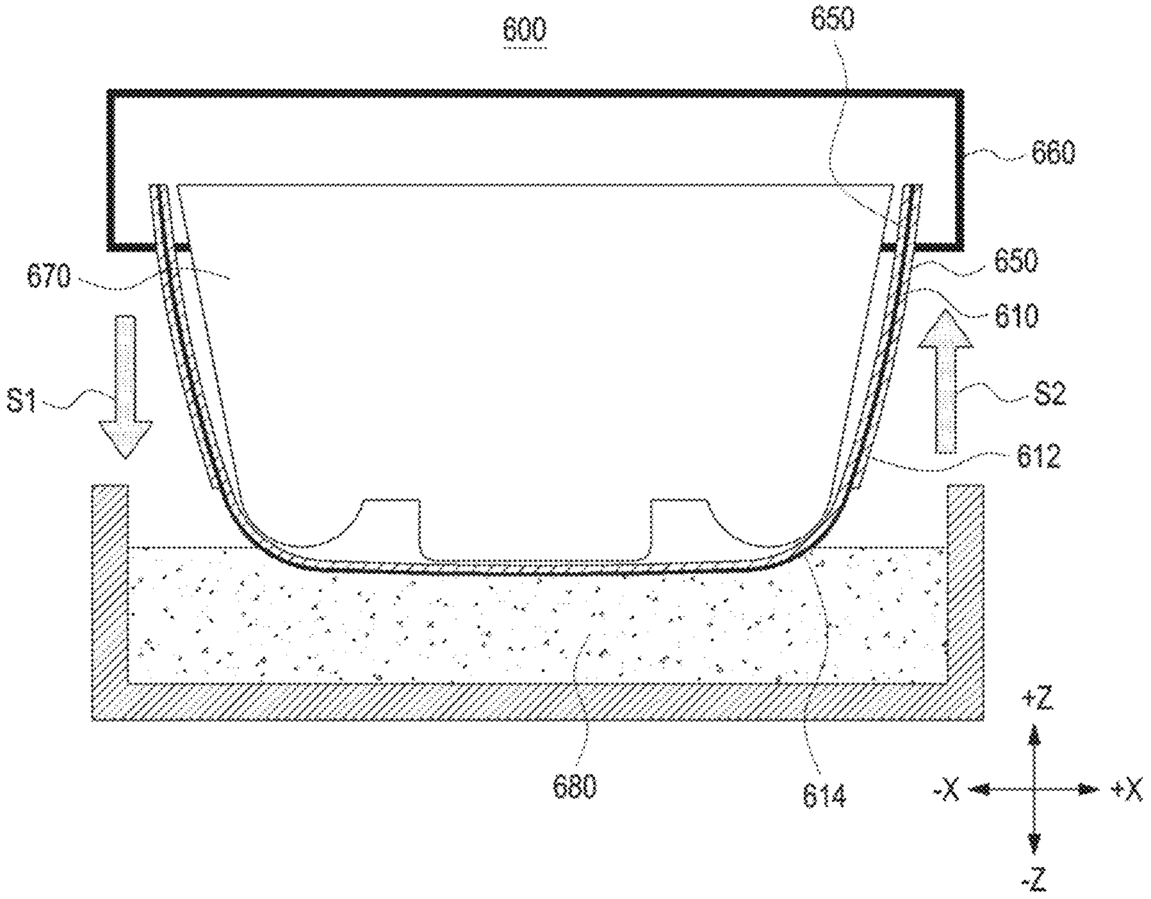
Figure 21:
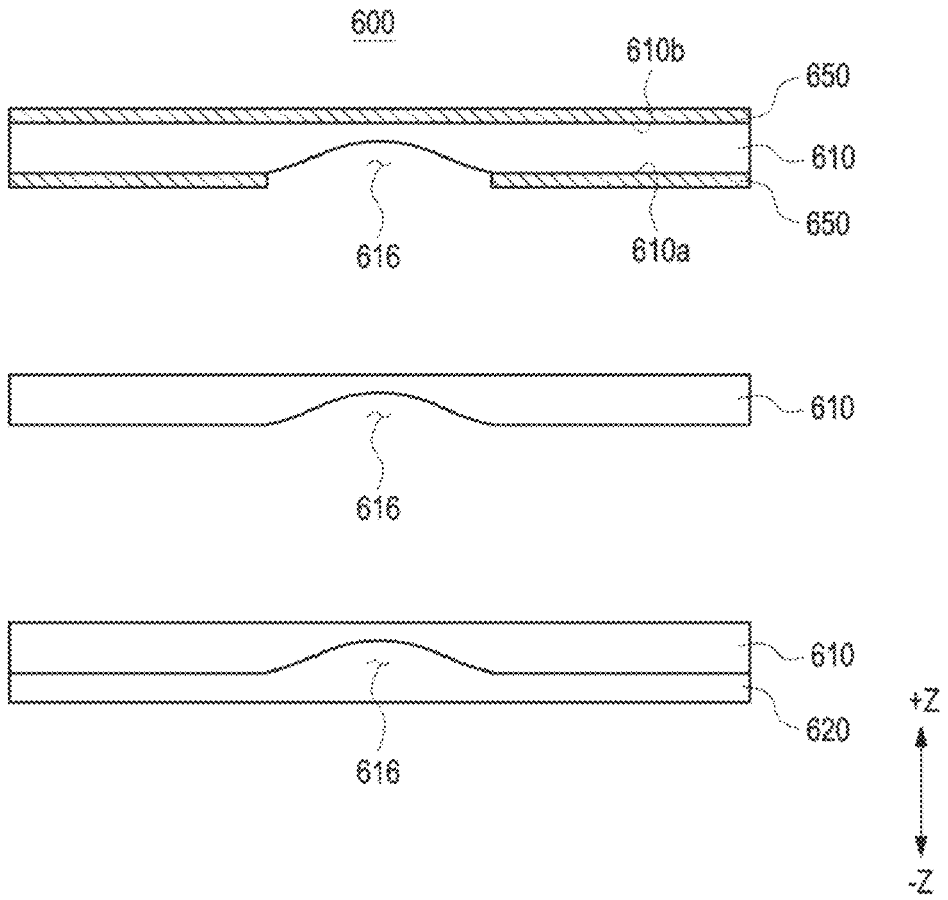
FIG. 21 is a view for describing a process of removing the protective ink from the glass member and a process of placing a buffer member on the rear surface of the glass member according to various embodiments of the disclosure.

FIG. 12 is a flowchart illustrating a method 600 of manufacturing an electronic device according to various embodiments of the disclosure. FIGS. 13 and 14 are views for describing a process of applying a protective ink to a glass member according to various embodiments of the disclosure. FIGS. 15, 16, and 17 are views for describing a process of folding the glass member according to various embodiments of the disclosure. FIGS. 18, 19, and 20 are views for describing a process of dipping the glass member into a chemical solution according to various embodiments of the disclosure. FIG. 21 is a view for describing a process of removing the protective ink from the glass member and a process of placing a buffer member on the rear surface of the glass member according to various embodiments of the disclosure.

Referring to FIGS. 12, 13, 14, 15, 16, 17, 18, 19, 20, and 21, a method 600 of manufacturing an electronic device may include a process 1010 of applying a protective ink, a process 1020 of folding a glass member, the processing 1030 of dipping/immersing the glass member into a chemical solution, and a process 1040 of removing the protective ink. The configurations of the glass member 610, the flat area 612, and the folding area 614 of FIGS. 13, 14, 15, 16, 17, 18, 19, 20, and 21 may wholly or partly the same as those of the glass member 410, the flat area 412, and the folding area 414 of FIGS. 7, 8, 9, and 10.

According to various embodiments, through the process 1010 of applying the protective ink 650 to the glass member 610, the protective ink 650 may be placed on a portion of the rear surface 610*a* of the glass member 610, and the front surface 610*b* of the glass member 610. According to an embodiment, the protective ink 650 may cover the front surface 610*b* and the rear surface 610*a* of the flat area 612 and the rear surface 610*a* of the bending area 614. The front surface 610*b* of the bending area 614 and the side surface 610*c* of the glass member 610 may be physically exposed. According to an embodiment, the protective ink 650 may include an acid-resistant material. For example, the protective ink 650 may protect the glass member 610 from a chemical solution configured to dissolve the glass member 610. According to another embodiment, the protective ink 650 may be placed on the rear and front surfaces of the first flat area 612*a* and the second flat area 612*b*, and the front surface 610*b* and the rear surface 610*a* of the bending area 614 may be exposed to the outside. When the protective ink 650 is not applied to the front surface 610*b* and the rear surface 610*a* of the bending area 614, at least a portion of one surface (e.g., the first surface 410*a* in FIG. 7C) of the glass member (e.g., the glass member 410 in FIG. 7C) and at least a portion of the other surface (e.g., the second surface 410*b* in FIG. 7C) may be bent.

According to various embodiments, the protective ink 650 may be placed on the glass member 610 to correspond to the shape of the electronic device (e.g., the electronic device 100 in FIGS. 1, 2, and 3 or the electronic device 300 in FIGS. 4, 5, and 6). According to an embodiment (e.g., FIG. 14), the protective ink 650 may be placed on the rear and front surfaces 610*a* and 610*b* of the first flat area 612*a*, the second flat area 612*b*, and the third flat area 612*c*, and the front surfaces 610*b* of the first bending area 614*a* and the second bending area 614*b*.

According to various embodiments, through the process 1020 of folding the glass member 610, the glass member 610 may be coupled to an external electronic device (e.g., the manufacturing facility 660 in FIGS. 15, 16, 17, 18, 19, and 20) in a folded state. According to an embodiment, the glass member 610 may be folded in the state in which at least portions of the front surface 610*b* to which the protective ink 650 is applied face each other, and may be coupled to the manufacturing facility 660. The rear surface 610*a* of the glass member 610 may be at least partially exposed to the outside of the glass member 610. For example, the rear surface 610*a* of the folding area 614 of the glass member 610 may be exposed downward (e.g., in the −Z direction) of the glass member 610. According to an embodiment, the manufacturing facility 660 may be movable in a height direction (e.g., the Z-axis direction).

According to various embodiments, the process 1020 of folding the glass member 610 may further include a process of coupling the glass member 610 to a jig 670 which is in contact with at least some of the protective ink 650. The glass member 610 may be bent to correspond to the shape of the jig 670, and the shape of the jig 670 may be variously changed based on an electronic device (e.g., the electronic device 100 in FIGS. 1, 2, and 3 or the electronic device 300 in FIGS. 4, 5, and 6). According to an embodiment, when the electronic device 100 is a multi-foldable electronic device, the glass member 610 may include multiple bending areas 614 which are spaced apart from each other. The jig 670 may have a structure for making the multiple bending areas 614 face downward (e.g., the −Z direction) of the glass member 610. For example, the jig 670 may include a body portion 672 connected to the manufacturing facility 660, multiple protrusions 674 extending downward (e.g., to −Z direction) from the body portion 672 and facing the multiple bending areas 614, and a pin structure 676 located between the multiple protrusions 674 and facing at least a portion of the flat area 612. The glass member 610 may be coupled to the manufacturing facility 660 and/or the jig 670 in the state of being located between the multiple protrusions 674 and the pin structure 676. According to an embodiment, when the electronic device 300 is a rollable electronic device, the glass member 610 may include flat areas 612 and bending areas 614, and the length of the bending areas 614 in the horizontal direction (e.g., the X-axis direction) may be greater than the length of the flat areas 612 in the horizontal direction (e.g., in the X-axis direction). The jig 670 may have a structure to make the bending areas 614 face downward of the glass member 610 (e.g., the −Z direction). For example, the jig 670 may include a body portion 672 connected to the manufacturing facility 660, and multiple protrusions 674 facing at least a portion of the bending areas 614.

According to various embodiments, by using the process 1030 of dipping the glass member 610 into the chemical solution 680, the bending areas 614 of the glass member 610 may be shaped differently from the flat areas 612. For example, the flat areas 612 may at least partially react with the chemical solution 680 so that the thickness and width of the bending areas 614 may continuously or gradually decrease.

According to various embodiments, the chemical solution 680 may be a solution capable of dissolving the glass member 610. For example, the chemical solution 680 may include at least one of ammonium fluoride ($NH_4F$), sulfuric acid ($H_2SO_4$), nitric acid ($HNO_3$), silicofluoric acid ($H_2SIF_6$), sodium hydroxide (NaOH), or hydrofluoric acid (HF).

According to various embodiments, the process of dipping the glass member 610 into the chemical solution 680 (1030) may include a process of moving the glass member 610 to a first direction (e.g., −Z direction) at which the glass member 610 is located (S1) and a process of moving the glass member 610 to a second direction (e.g., +Z direction) opposite to the first direction. According to an embodiment, the jig 670 may be connected to the manufacturing facility 660 and move in the height direction (e.g., the Z-axis direction) together with the manufacturing facility 660.

According to various embodiments, at least one of the shape, the thickness change rate (e.g., inclination), and the width change rate (e.g., inclination) of the bending areas 614 of the glass member 610 may be determined based on at least one of a period of time in which the chemical solution 680 is located within the chemical solution 680, the type of the chemical solution 680, and the moving speed of the glass member 610 in the dipping process (1030). For example, when the glass member 610 continuously moves, the thickness and width of the bending area 614 may continuously decrease or increase.

According to various embodiments, through the process 1040 of removing the protective ink 650, the front surface 610*b* and the rear surface 610*a* of the glass member 610 may be exposed. According to an embodiment, the protective ink 650 may be removed by using a solution configured to dissolve the protective ink 650 (e.g., a developer). According to an embodiment, an area on which the protective ink 650 is not placed (e.g., a portion of the rear surface 610*a* of the glass member 610) may be different from an area on which the protective ink 650 is placed in thickness and/or width. For example, the glass member 610 may include a first recess 616. The configuration of the first recess 616 of FIG. 21 may be wholly or partly the same as the configuration of the first recess 416 of FIG. 8.

According to various embodiments, the method 600 of manufacturing an electronic device may further include a process 1050 of disposing the buffer member 620 on the rear surface 610*a* of the glass member 610. According to an embodiment, the buffer member 620 may be located in the first recess 616. For example, the buffer member 620 may be disposed on the rear surface 610*a* of the glass member 610 in which the first recess 616 is formed by using at least one of application, coating, or filling.

According to various embodiments of the disclosure, an electronic device (e.g., the electronic device 500 of FIGS. 7A-7C) may include a flexible display (e.g., the flexible display 510 in FIGS. 7A-7C) and a cover window (e.g., the cover window 400 in FIGS. 7A-7C) disposed on the flexible display. The cover window may include a glass member (e.g., the glass member 410 in FIGS. 7A-7C), and a buffer member (e.g., the buffer member 420 in FIGS. 7A-7C) disposed between the glass member and the flexible display. The glass member may include at least one flat area (e.g., the flat area 412 in FIGS. 7A-7C) and a bending area (e.g., the bending area 414 of FIGS. 7A-7C) extending from the at least one flat area. The bending area may have a thickness (e.g., the second thickness t2 in FIG. 8) that continuously decreases compared to the thickness of the at least one flat area (e.g., the first thickness t1 in FIG. 8), and the bending area may have a width (e.g., the second width w2 in FIG. 8) may continuously decreases compared to the width of the at least one flat area (e.g., the first width w1 in FIG. 8).

According to various embodiments, the glass member may include a first surface (e.g., the first surface 410*a* in FIGS. 7A-7C) facing the buffer member and a substantially flat second surface (e.g., the second surface 410*b* of FIGS. 7A-7C) facing outward of the electronic device, and the buffer member may include a substantially flat third surface (e.g., the third surface 420*a* in FIGS. 7A-7C) facing the flexible display.

According to various embodiments, the bending area of the glass member may include a first recess (e.g., the first recess 416 in FIG. 8) provided in the first surface (e.g., the first surface 410*a* in FIGS. 7A-7C) facing the buffer member, and a second recess (e.g., the second recess 418 in FIG. 8) provided in an edge (e.g., the edge 410*c* in FIGS. 7A-7C) of the bending area of the glass member, and the second recess may extend continuously from the first recess.

According to various embodiments, a first length (e.g., the first length d1 in FIG. 8) that is the length of the first recess in the thickness direction and a second length (e.g., the second length d2 in FIG. 8) that is the length of the second recess in the width direction may be substantially equal to each other.

According to various embodiments, the external device may include a first housing (e.g., the first housing 110 in FIG. 1) configured to accommodate a portion of the flexible display and a portion of the cover window, a second housing (e.g., the second housing 120 in FIG. 1) configured to accommodate another portion of the flexible display and another portion of the cover window, and a hinge structure (e.g., the hinge structure 102 in FIG. 3) connecting the first housing and the second housing to each other. At least a portion of the bending area may overlap at least a portion of the hinge structure.

According to various embodiments, the bending area may include a first bending area (e.g., the first bending area 414*a* in FIG. 9), and a second bending area (e.g., the second bending area 414*b* in FIG. 9) spaced apart from the first bending area. The at least one flat area may include a first flat area (e.g., the first flat area 412*a* in FIG. 9), a second flat area (e.g., the second flat area 412*b* of FIG. 9) spaced apart from the first flat area, and a third flat area (e.g., the third flat area 412*c* of FIG. 9) spaced apart from the first flat area and the second flat area and located between the first bending area and the second bending area.

According to various embodiments, the external device may include a first structure (e.g., the first structure 301 in FIG. 5), a second structure (e.g., the second structure 302 of FIG. 5) surrounding at least a portion of the first structure and configured to guide the sliding movement of the first structure, and a roller (e.g., the roller 351 in FIG. 6) rotatably mounted on one edge of the second structure. At least a portion of the at least one flat area may be coupled to the first structure, and at least a portion of the bending area may be configured to be wound around the roller.

According to various embodiments, the cover window may include a scattering prevention film (e.g., the scattering prevention film 440 in FIGS. 7A-7C) disposed on the glass member and a coating layer (e.g., the coating layer 430 in FIGS. 7A-7C) disposed on the scattering prevention film.

According to various embodiments, at least a portion of the bending area may react with at least one of ammonium fluoride, sulfuric acid, nitric acid, silicofluoric acid, sodium hydroxide, or hydrofluoric acid.

According to various embodiments, the bending area may have a thickness of 30 μm to 50 μm, and the at least one flat area may have a thickness of 50 μm to 200 μm.

According to various embodiments, the buffer member may include an optically clear adhesive or a pressure-sensitive adhesive.

According to various embodiments of the disclosure, a method of manufacturing an electronic device (e.g., the method 600 of manufacturing an electronic device of FIG. 13) may include a process 1010 of applying a protective ink (e.g., the protective ink 650 in FIG. 13) to a front surface (e.g., the front surface 610*b* in FIG. 13) of a glass member (e.g., the glass member 610 in FIG. 13) including at least one flat area (e.g., the flat area 612 in FIG. 13) and a bending area (e.g., the bending area 614 in FIG. 13) extending from the at least one flat area and a rear surface (e.g., the rear surface 610*a* in FIG. 13) of the at least one flat area of the glass member (e.g., the process 1010 of applying the protective ink in FIG. 12); a process 1020 of folding the glass member such that at least some portions of the front surface of the glass member face each other (e.g., the process 1020 of folding the glass member in FIG. 12); a process 1030 of dipping at least a portion of the bending area into a chemical solution (e.g., the chemical solution 680 in FIG. 18) configured to dissolve the glass member (e.g., the process 1030 of dipping the glass member into the chemical solution in FIG. 12); and a process 1040 of removing the protective ink (e.g., the process 1040 of removing the protective ink in FIG. 12).

According to various embodiments, the dipping process may include a process of moving the glass member to a first direction (e.g., the −Z direction in FIG. 18) at which the chemical solution is located (e.g., the first process (S1) in FIG. 18) and a process of moving the glass member to a second direction opposite to the first direction (e.g., the +Z direction in FIG. 18) (e.g., the second process (S2) in FIG. 18).

According to various embodiments, the chemical solution may include at least one of ammonium fluoride, sulfuric acid, nitric acid, silicofluoric acid, sodium hydroxide, or hydrofluoric acid.

According to various embodiments, the method may further include a process of coupling the glass member to a jig (e.g., the jig 670 in FIG. 19) which comes into contact with at least some of the protection ink.

According to various embodiments, the jig may include multiple protrusions (e.g., the protrusions 674 in FIG. 16) facing at least a portion of the bending area, and a pin structure (e.g., the pin structure 676 in FIG. 16) located between the multiple protrusions and facing at least a portion of the bending area. The glass member may be located between the multiple protrusions and the pin structure.

According to various embodiments, the thickness (e.g., the second thickness t2 in FIG. 8) of the bending area of the glass member dissolved by the chemical solution may continuously decrease compared to the thickness of the at least one flat area (e.g., the first thickness t1 in FIG. 8), and the bending area may have a width (e.g., the second width w2 in FIG. 8) may continuously decrease compared to the width of the at least one flat area (e.g., the first width w1 in FIG. 8).

According to various embodiments, the method of manufacturing an electronic device may further include a process 1050 of disposing a buffer member (e.g., the buffer member 620 in FIG. 21) on the rear surface of the glass member (e.g., the process 1050 of disposing the buffer member on the rear surface of the glass member in FIG. 12).

According to various embodiments, the buffer member may include at least one of an optically clear adhesive or a pressure-sensitive adhesive.

According to various embodiments of the disclosure, the cover window (e.g., the cover window 400 in FIGS. 7A, 7B, and 7C) may include a glass member (e.g., the glass member 410 of FIGS. 7A. 7B, and 7C) and a buffer member (e.g., the buffer member 420 in FIGS. 7A, 7B, and 7C) disposed below the glass member. The glass member may include multiple flat areas (e.g., the flat areas 412 in FIGS. 7A and 7B) and a bending area (e.g., the bending area 414 in FIGS. 7A-7C) located between the multiple flat areas. The bending area may have a thickness (e.g., the second thickness t2 in FIG. 8) that continuously decreases compared to the thickness of the multiple flat areas (e.g., the first thickness t1 in FIG. 8), and the bending area may have a width (e.g., the second width w2 in FIG. 8) may continuously decreases compared to the width of the multiple flat areas (e.g., the first width w1 in FIG. 8).

What is claimed is:

1. An electronic device comprising:

a flexible display; and a cover window disposed on the flexible display, wherein the cover window comprises a glass member and a buffer member disposed between the glass member and the flexible display, wherein the glass member comprises at least one flat area and a bending area extending from the at least one flat area, and wherein a thickness of at least a portion of the bending area continuously decreases from a thickness of the at least one flat area as the bending area extends from the at least one flat area, and a width of the at least the portion of the bending area continuously decreases from a width of the at least one flat area as the bending area extends from the at least one flat area, wherein the bending area comprises a first recess on a first surface facing the buffer member and recessed in a first curved shape, and a second recess on an edge of the bending area and recessed in a second curved shape, and wherein the second recess extends continuously from the first recess.

2. The electronic device of claim 1, wherein the glass member further comprises a flat second surface facing outward of the electronic device, and wherein the buffer member comprises a flat third surface facing the flexible display.

3. The electronic device of claim 1, wherein a first length of the first recess in a thickness direction is equal to a second length of the second recess in a width direction that is perpendicular to the thickness direction.

4. The electronic device of claim 1, further comprising:

a first housing configured to accommodate a portion of the flexible display and a portion of the cover window;

a second housing configured to accommodate another portion of the flexible display and another portion of the cover window; and a hinge structure connecting the first housing to the second housing, wherein at least the portion of the bending area overlaps at least a portion of the hinge structure.

5. The electronic device of claim 1, wherein the bending area comprises a first bending area and a second bending area that is spaced apart from the first bending area, wherein the at least one flat area comprises a first flat area, a second flat area that is spaced apart from the first flat area, and a third flat area that is spaced apart from the first flat area and the second flat area, and wherein the third flat area is between the first bending area and the second bending area.

6. The electronic device of claim 1, further comprising:

a first structure;

a second structure surrounding at least a portion of the first structure and configured to guide a sliding movement of the first structure; and a roller rotatably mounted on a side edge of the second structure, wherein at least a portion of the at least one flat area is coupled to the first structure, and wherein at least the portion of the bending area is configured to be wound around the roller.

7. The electronic device of claim 1, wherein the cover window further comprises:

a scattering prevention film disposed on the glass member; and a coating layer disposed on the scattering prevention film.

8. The electronic device of claim 1, wherein at least the portion of the bending area differs from another portion of the bending area by having been reacted with at least one of ammonium fluoride, sulfuric acid, nitric acid, silicofluoric acid, sodium hydroxide, and hydrofluoric acid.

9. The electronic device of claim 1, wherein the thickness of the bending area is 30 μm to 50 μm, and the thickness of the at least one flat area is 50 μm to 200 μm.

10. The electronic device of claim 1, wherein the buffer member comprises at least one of an optically clear adhesive or a pressure-sensitive adhesive.

11. The electronic device of claim 1, wherein the edge of the bending area is a first edge of the bending area and is extended along the width, wherein the bending area comprises a second edge extended in parallel to the first edge, wherein the first recess is extended from the first edge to the second edge, and wherein the second recess is at the first edge and the second curved shape of the second recess is curved into the first edge and towards the second edge.

12. The electronic device of claim 1, wherein the thickness of the at least the portion of the bending area is a dimension in a stacking direction of the glass member and the buffer member, and the width of the at least the portion of the bending area is a dimension in a direction perpendicular to the stacking direction and intersecting a direction in which the bending area extends from the at least one flat area, wherein the first curved shape of the first recess is curved into the thickness of the at least the portion of the bending area, wherein the second curved shape of the second recess is curved into the bending area, and wherein a direction in which the second curved shape is curved into the bending area is perpendicular both to the width of the at least the portion of the bending area and to the thickness of the at least the portion of the bending area.

* * * * *